US007836355B2

(12) United States Patent  
Raghunandan

(10) Patent No.: US 7,836,355 B2  
(45) Date of Patent: Nov. 16, 2010

(54) AUTOMATIC MAINTENANCE OF A COMPUTING SYSTEM IN A STEADY STATE USING CORRELATION

(75) Inventor: Hulikunta Prahlad Raghunandan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/949,132

(22) Filed: Dec. 3, 2007

(65) Prior Publication Data

US 2009/0144352 A1  Jun. 4, 2009

(51) Int. Cl.  
*G06F 11/00* (2006.01)

(52) U.S. Cl. ......................................................... 714/47

(58) Field of Classification Search ...................... 714/6, 714/7, 47; 700/79  
See application file for complete search history.

(56) References Cited

U.S. PATENT DOCUMENTS 4,755,925 A * 7/1988 Tsuchiya et al. .............. 700/30

6,836,704 B2 * 12/2004 Walsh ........................ 700/299  
2003/0229471 A1 12/2003 Guralnik et al.  
2004/0078099 A1 * 4/2004 Varma et al. .................. 700/52  
2004/0088601 A1 * 5/2004 Shah et al. ..................... 714/15

OTHER PUBLICATIONS

A.Y. Milanes et al., "Design and implementation of a global self-tuning architecture," Simpósio Brasileiro de Bancos de Dados (USSB),Oct. 2005, MG, Brazil.  
L. Stojanovic et al., "The role of ontologies in autonomic computing systems," IBM Systems Journal, vol. 43, No. 3, 2004.

* cited by examiner

*Primary Examiner*—Byrce P Bonzo

(57) ABSTRACT

An autonomic computing system is automatically maintained in a steady state. The system has a number of parameters, each of which has one or more threshold. The system may further have a number of influencers, adjustment of which affects values of the parameters. One or more of the parameters are determined as each reaching one of its threshold, and are referred to as to-be-affected parameters. Each to-be-affected parameter is identified and its thresholds identified. A correlation value may be determined between each influencer and each to-be-affected parameter, and/or between each to-be-affected parameter and each other to-be-affected parameter. The to-be-affected parameters are adjusted, based on the correlation values determined, so that the to-be-affected parameters return to more-normal values.

3 Claims, 17 Drawing Sheets

AUTOMATIC MAINTENANCE OF A COMPUTING SYSTEM IN A STEADY STATE USING CORRELATION

FIELD OF THE INVENTION

The present invention relates generally to automatically maintaining an autonomic computing system in a steady state, and more particularly to automatic maintenance of such a system in a steady state by adjusting influencers and/or parameters based on correlation values that have been determined.

BACKGROUND OF THE INVENTION

An autonomic computing system is a computing system that includes a continuous control loop for monitoring activities that take place and for taking corrective actions as needed to adjust the system so that the system continues to perform its intended functionality and satisfy its intended objectives. Existing autonomic computing systems typically rely on a "bottom up" approach to implement this control loop. In particular, such an autonomic computing system typically includes one or more managed constituent elements that provide control loop functionality. Thus, to impart autonomicity within a computing system, the system has to be designed, developed, and implemented at an early stage to include such elements.

Such a "bottom up" approach to implementing a control loop within a computing system to provide the system with autonomicity can be disadvantageous. For instance, for existing computing systems that do not have autonomicity, adding one or more such elements can be difficult, if not impossible, to achieve without completely redesigning the systems at undue time and/or expense. Furthermore, constructing a computing system so that it is planned from the beginning to have autonomicity can itself even be laborious, especially where the system in question is or will be relatively large and/or complex. These and other shortcomings of the prior art are addressed by the present invention.

SUMMARY OF THE INVENTION

The present invention relates to automatically maintaining an autonomic computing system in a steady state. In one embodiment, the autonomic computing system includes a number of parameters, each of which has one or more thresholds. The autonomic computing system may further have a number of influencers, adjustment of which affects values of the parameters. A method of this embodiment of the invention, in response to determining that one or more of the parameters are each reaching one of the thresholds of the parameter, where the one or more of the parameters referred to as to-be-affected parameters, performs the following. Each to-be-affected parameter and the thresholds of the to-be-affected parameter are identified. For each influencer, a correlation value is determined between the influencer and each to-be-affected parameter. One or more of the influencers are then adjusted so that the to-be-affected parameters return to more-normal values, based on the correlation values determined.

This embodiment of the invention can be modified based on various aspects of the influencers. The influencers may be distinctly associated with the parameters, such that adjustment of each influencer affects the value of only one of the parameters. Other influencers may be commonly associated with more than one of the parameters, such that adjustment of each such common influencer affects the values of more than one of the parameters. Adjustment of an influencer may affect the value of a given parameter in real time, or in variable time, the latter which is also referred to herein as the influencer affecting the value of the parameter in question at a response time. The influencers may be direct (or parameter) influencers, such that adjustment thereof directly affects parameters, or they may be meta influencers, such that adjustment thereof directly affects only other influencers.

In another embodiment, the autonomic computing system also includes a number of parameters, each of which has one or more thresholds, but may not have a number of influencers. A method of this embodiment of the invention, in response to determining that one or more of the parameters are each reaching one of the thresholds of the parameter, where the one or more of the parameters referred to as to-be-affected parameters, performs the following. Each to-be-affected parameter and the thresholds of the to-be-affected parameter are identified. A correlation value is determined between each influencer and each other to-be-affected parameter. One or more of the to-be-affected parameters are then adjusted so that the to-be-affected parameters return to more-normal values, based on the correlation values determined.

This embodiment of the invention can be modified based on various aspects of the parameters. A parameter may itself affect other parameters, in real time or in variable time, where the latter is also referred to herein as the parameter affecting the value of another parameter at a response time. Furthermore, a parameter itself may be affected such that it responds in real time or in variable time; that is, a parameter itself may affect the system as a whole in real time or in variable time, where the latter is also referred to herein as the parameter being affected at a response time. The parameters may also be affected in real time or in variable time, such that a parameter can be affected immediately, or it cannot be affected until a length of time has transpired.

Methods of various embodiments of the invention may be implemented in one embodiment as one or more computer programs stored on a computer-readable medium. The computer-readable medium may be a tangible computer-readable medium, such as a recordable data storage medium or another type of tangible computer-readable medium. The computer-readable medium may alternatively be an intangible computer-readable medium, such as a modulated carrier signal or another type of intangible computer-readable medium.

Embodiments of the invention provide for advantages over the prior art. In contradistinction to the "bottom up" approach of implementing autonomicity within a computing system, embodiments of the invention effectively provide for a "top down" approach. That is, rather than concentrating on specific constituent elements of the system to implement autonomicity within the system, embodiments of the invention focus on the system as a whole—such as its influencers and parameters—to implement autonomicity. As a result, autonomicity is more easily added to existing computing systems that currently do not have autonomicity, and further may be added to even large and complex systems that may otherwise resist implementation of autonomicity therein.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustra

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Representative System

Figure 1:
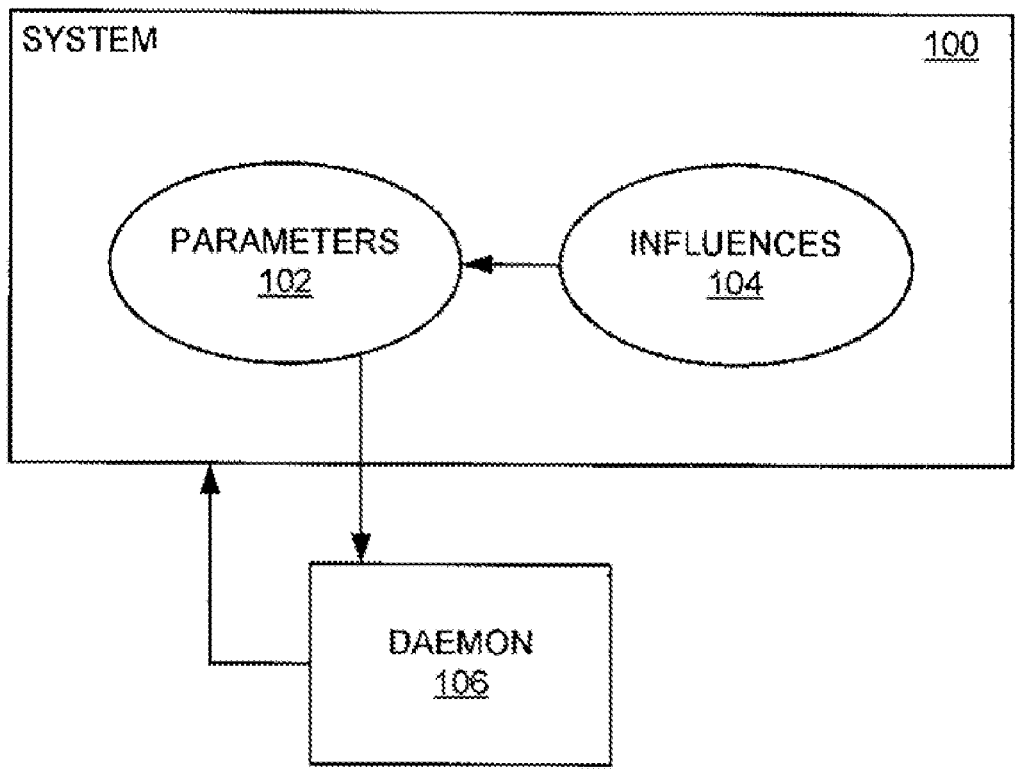
- FIG. 1 is a diagram of a system, in relation to which embodiments of the invention can be implemented.

FIG. 1 shows a representative system 100, in relation to which embodiments of the invention described below can be implemented. The system 100 is a computing system. The system 100 includes a number of parameters 102 and a number of influencers 104. Those of ordinary skill within the art can appreciate that the system 100 typically will and does include other components, in addition to those depicted in FIG. 1, such as processors, memory, storage devices, and so on.

The parameters 102 of the system 100 are attributes or characteristics of the system 100 by which the current state of the system 100 can be determined. In particular, each of the parameters 102 may have one or more thresholds corresponding to when the system 100 is no longer in a desirable steady state. These thresholds of each parameter may include a minimum threshold, corresponding to a minimum value of the parameter in question, and/or a maximum threshold, corresponding to a maximum value of the parameter in question. It can be said that the system 100 is not at a desirable steady state when any of the parameters 102 have a value at its minimum or maximum threshold.

Examples of operating system-related parameters include the number of clients that can be operated by the operating system in question, such as the AIX operating system. Examples of DB2 database manager-related parameters include the amount of memory that is allocated from operating system memory. This amount of memory is adjusted based on fetching data from storage, writing back from to storage, transactions, sorting data for transactions, applications, as well as other requirements.

Examples of Java-related parameters, for the Java programming language, include the parameters known to those of ordinary skill within the art as the following:

Xgcthreads<n>, referring to the number of threads;

Xnoclassgc, referring to whether garbage collection is on or off;

Xnocompactgc, referring to whether compaction is turned on or off;

Xoss<size>, referring to the maximum Java-related stack size for a given thread;

Xss<size>, referring to the maximum native stack size for a given thread;

Xlp, referring to whether large page support is enabled;

Xdisableeplicitgc, referring to whether garbage collection is turned on or off;

Xifa:<on|off|force>, referring to whether Java code is able to be run on z/OS zAAP processors, as known within the art;

Xmaxe/Xmine, referring to the maximum and minimum expansion unit that is set during allocation;

Xms, referring to minimum heap size; and,

Xmx, referring to maximum heap size.

The influencers 104 of the system 100 influence the parameters 102 either directly or indirectly. Thus, perturbing or adjusting an influencer ultimately causes one or more of the parameters 102 to change value, either immediately or over time. The influencers 104 are therefore the mechanism by which the parameters 102 are modified so that the system 100 remains in a steady state, and so that the parameters 102 preferably do not reach any of their corresponding thresholds. For instance, examples of the influencers 104 include, in relation to the Java programming language, objection allocation rate, object mortality and load characteristics, and so on, in particular relation to the Xms and Xmx parameters.

A daemon 106 monitors the parameters 102 of the system 100 to determine if any of the parameters 102 have values that are trending towards thresholds, or if any of the parameters 102 have values that have reached thresholds. In response, the daemon 106 notifies the system 100. As such, the system 100 can appropriately perturb or adjust the influencers 104 so that these parameters 102 return to more-normal values and do not reach or no longer are at thresholds. The daemon 106 is a background process or service, which may run on the system 100 itself or on another system.

In this way, the computing system 100 is an autonomic computing system that is automatically maintained in a steady state. As the parameters 102 of the system 100 are trending towards thresholds, or have reached their thresholds, the influencers 104 are perturbed so that the parameters 102 return to more-normal values, such as median values between the maximum and minimum thresholds of the parameters 102. The daemon 106 assists the system 100 in this respect by communicating to the system 100 when one or more of the parameters 102 are varying from their more-normal values.

First Embodiment

In a first embodiment of the invention, the system 100 includes parameters 102 and distinct influencers 104. That is, adjustment of each of the influencers 104 affects the value of only one of the parameters 102. Each of the parameters 102 may thus have a number of such direct influencers, such that adjusting any of these direct influencers affects the value of just the parameter in question.

In mathematical terms, there are n parameters P: $P_1$, $P_2$, ..., $P_n$. Furthermore, for each parameter $P_x$ there are m distinct influencers I: $I_{x1}, I_{x2}, ..., I_{xm}$. Thus the influencers $I_x*$ affect only the parameter $P_x$ in this embodiment of the invention. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$.

Figure 2:
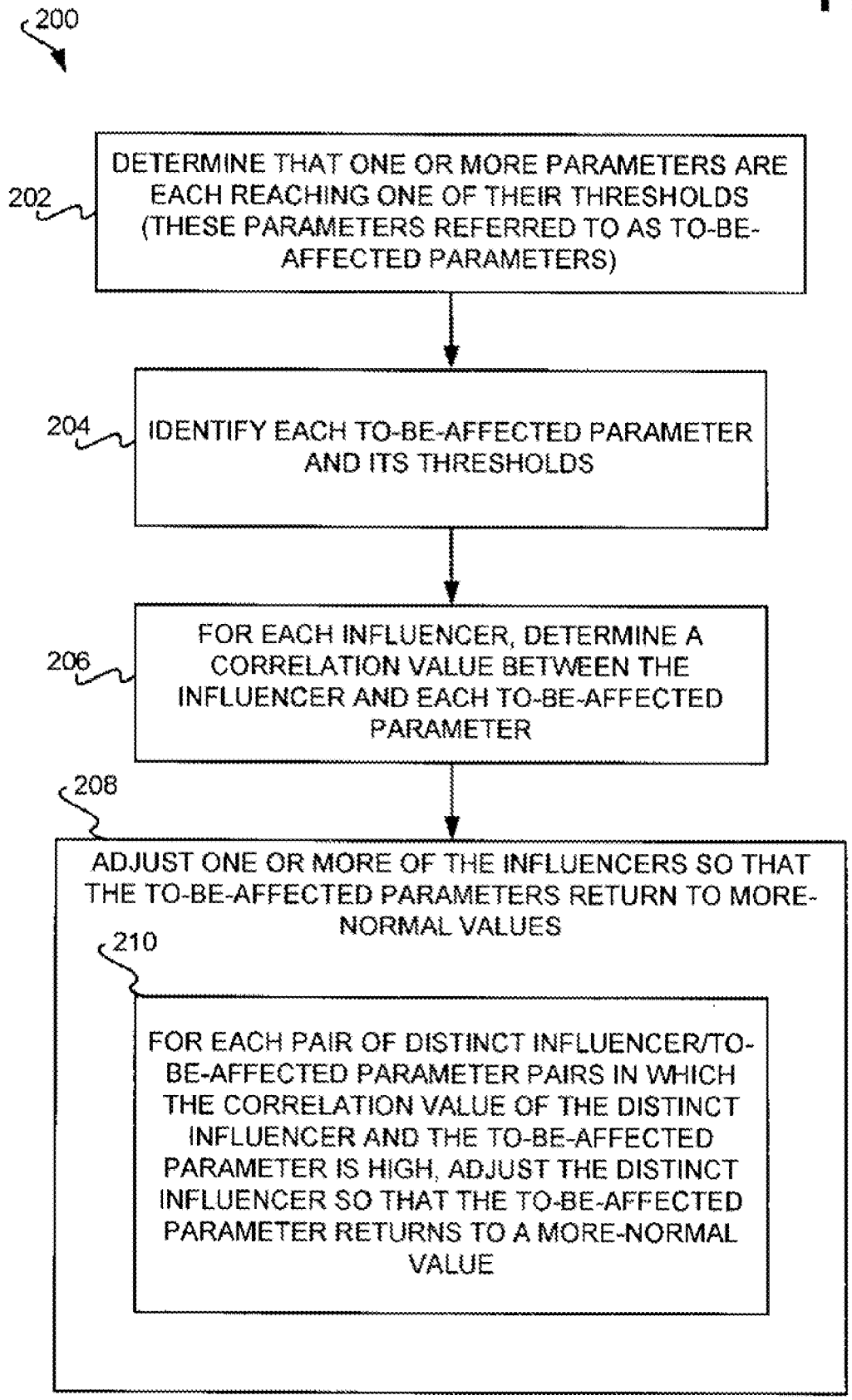
FIG. 2 is a flowchart of a method, according to a first embodiment of the invention.

FIG. 2 shows a method 200, according to this first embodiment of the invention. The daemon 106 determines that one or more of the parameters are each reaching one of their thresholds (202). These parameters are referred to herein as to-be-affected parameters. In response, the system 100 identifies each to-be-affected parameter and its thresholds (204).

For each influencer, a correlation value is determined between the influencer and each to-be-affected parameter (206). That is, for each to-be-affected parameter, a correlation value is determined between each distinct influencer of this parameter and this parameter. For each distinct influencer $I_{xy}$ influencing a given parameter $P_x$, where y=1 ... m, there is a correlation value r between −1 and 1 determined as follows:

$$r = \frac{n \sum pi - (\sum p)(\sum i)}{\sqrt{n(\sum p^2) - (\sum p)^2} \sqrt{n(\sum i^2) - (\sum i)^2}} \quad (1)$$

In Equation (1), p is one of the parameters $P_x$ and i is one of the distinct influencers $I_{xy}$ for the parameter p. Furthermore, n is the number of pairs of p and i. It is noted that correlation values for any type of values p and n can be determined via this equation as well, in various embodiments of the invention.

The net result of part 206 is that there are a number of distinct influencer/to-be-affected parameter pairs for which correlation values have been determined. More specifically, for each to-be-affected parameter, there are m such pairs, where m is the number of distinct influencers for the parameter in question. For example, for parameter $P_2$, if there are three distinct influencers, i.e., m=3, then there are three correlation values, one for each of the pairs $I_{21}/P_2$, $I_{22}/P_2$, and $I_{23}/P_2$.

Thereafter, the method 200 adjusts one or more of the influencers so that the to-be-affected parameters return to more-normal values, such as to their median values (208). In particular, for each pair of distinct influencer/to-be-affected parameter pairs in which the correlation value between the distinct influencer and the to-be-affected parameter is high, the distinct influencer is adjusted so that the to-be-affected parameter returns to a more-normal value (210). For example, the parameter $P_3$ may be a to-be-affected parameter, and it may have m=9 distinct influencers. The distinct influencer $I_{3y}$ for which there is a highest correlation between $I_{3y}$ and $P_3$ is the distinct influencer that is adjusted or perturbed to return the parameter $P_3$ to a more-normal value, such as the median value of the parameter $P_3$.

Second Embodiment

In a second embodiment of the invention, the system 100 includes parameters 102 and influencers 104, where the influencers include both distinct influencers and common influencers. As before, adjustment of each of the distinct influencers 104 affects the value of only one of the parameters, such that each of the parameters 102 may have a number of such direct influencers, the adjustment of each of which affects the value of just the parameter in question. By comparison, adjustment of each of the common influencers 104 affects the values of more than one parameter. Thus, adjustment of a common influencer affects the values of at least two parameters associated with the common influencer in question.

In mathematical terms, there are n parameters P: $P_1$, $P_2$, ..., $P_n$. Furthermore, for each parameter $P_x$ there may be m distinct influencers I: $I_{x1}, I_{x2}, ..., I_{xm}$. Thus the distinct influencers $I_x*$ affect only the parameter $P_x$ in this embodiment of the invention. Each parameter $P_x$ also has two thresholds, a minimum threshold $T_{xmin}$ corresponding to the minimum value of the parameter $P_x$, and a maximum threshold $T_{xmin}$ corresponding to the maximum value of the parameter $P_x$. In addition, there may be l common influencers $I_c$: $I_{c1}$, $I_{c2}$, ..., $I_{cl}$. Each common influencer $I_{cw}$, where w=1 ... l, affects a set of parameters $\{P_a, P_b, ..., P_j\}$ where a, b, ... j are each selected from 1 ... n.

Figure 3:
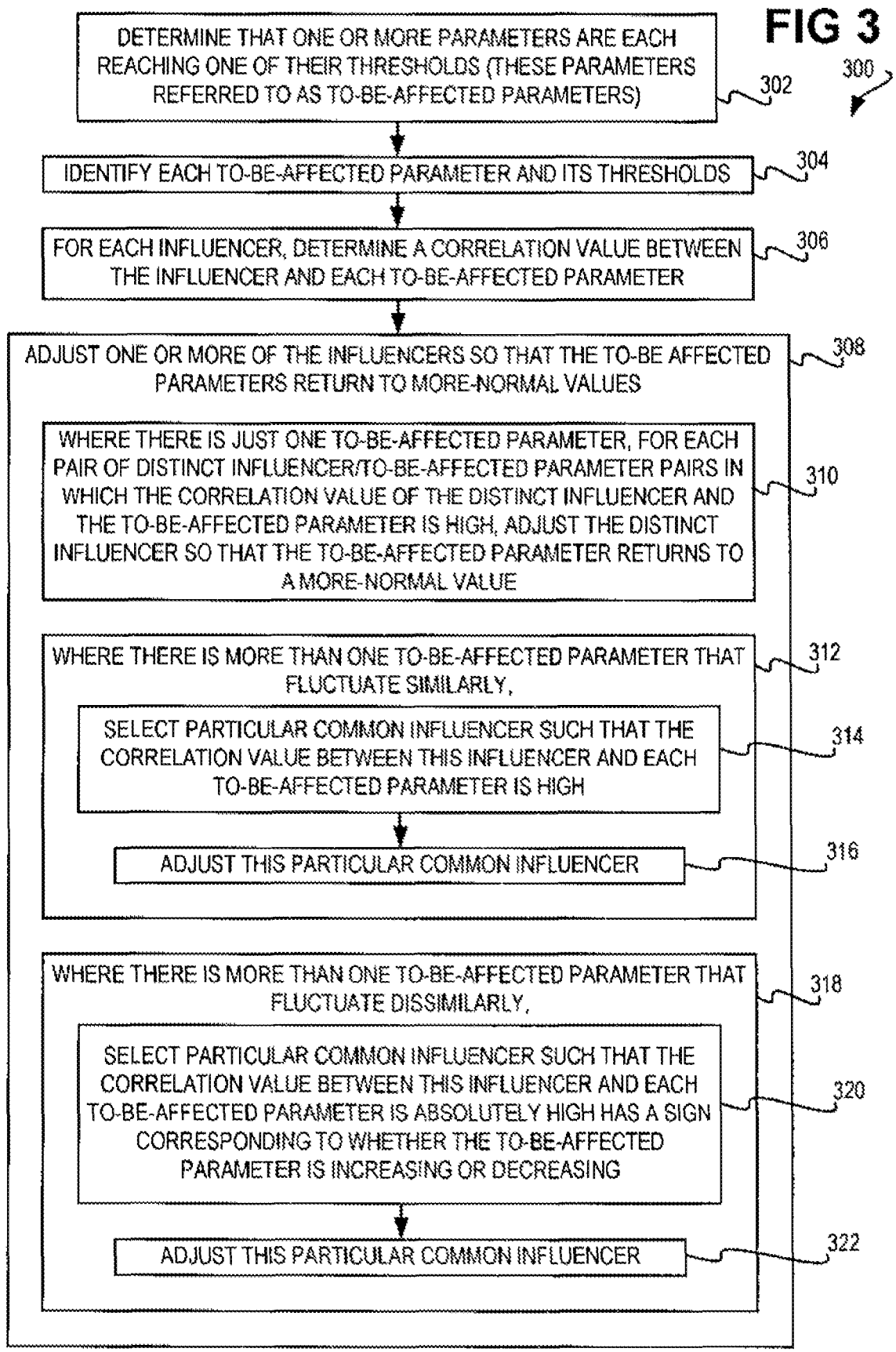
FIG. 3 is flowchart of a method, according to a second embodiment of the invention.

FIG. 3 shows a method 300, according to this second embodiment of the invention. As before, the daemon 106 determines that one or more of the parameters are each reaching one of their thresholds (302). These parameters are referred to herein as to-be-affected parameters. In response, the system 100 identifies each to-be-affected parameter and its thresholds (304).

For each influencer, a correlation value is determined between the influencer and each to-be-affected parameter (306). That is, for each to-be-affected parameter, a correlation value is determined between each distinct influencer of this parameter and this parameter, and a correlation value is determined between each common influencer affecting this parameter and this parameter. The correlation values are determined as has been described previously.

The method 300 then adjusts one or more of the influencers so that the to-be-affected parameters return to more-normal values, such as to their median values (308). In particular, there are three specific cases. First, where there is just one to-be-affected parameter, for each pair of distinct influencer/to-be-affected parameter pairs in which the correlation value between the distinct influencer and the to-be-affected parameter is high, the distinct influencer is adjusted (310). This corresponds to part 210 of the method 200 that has been described. Thus, if there is just one to-be-affected parameter, one or more of the distinct influencers for this parameter are adjusted.

Second, there may be more than one to-be-affected parameter (312), where these parameters fluctuate similarly. That is, all the to-be-affected parameters may be moving in the positive direction towards their maximum thresholds, or they all may be moving in the negative direction towards their minimum thresholds. In such instance, a particular common influencer is selected such that the correlation value between this influencer and each to-be-affected parameter is high (314). This particular common influencer is then adjusted to return all the to-be-affected parameters to their more-normal values (316).

Third, there may be more than one to-be-affected parameter (318), where these parameters fluctuate dissimilarly. For example, some to-be-affected parameters may be moving in the positive direction towards their maximum thresholds, and other to-be-affected parameters may be moving in the negative direction towards their minimum thresholds. In such instance, a particular common influencer is selected as follows (320). First, the correlation value between this influencer and each to-be-affected parameter is absolutely high; that is, the absolute value of each such correlation value is high. Second, the correlation value between this influencer and each to-be-affected parameter has a sign—positive or negative—corresponding to whether the to-be-affected parameter in question is increasing or decreasing.

For example, there may be two to-be-affected parameters. The first such parameter may be increasing towards its maximum threshold, and the second such parameter may be decreasing towards its minimum threshold. The correlation value between a particular common influencer and each of these parameters may be absolutely high. Furthermore, the sign of the correlation value between this influencer and the first parameter is positive, corresponding to the direction in which the first parameter is moving (i.e., it is increasing). Likewise, the sign of the correlation value between this influencer and the second parameter is negative, corresponding to the direction in which the second parameter is moving (i.e., it is decreasing). This particular common influencer is thus adjusted so that the to-be-affected parameters return to more-normal values (322), such as their median values.

Third Embodiment

In a third embodiment of the invention, the system includes parameters 102 and influencers 104, where the influencers are all distinct influencers, as in the first embodiment. Thus, adjustment of each of the distinct influencers 104 affects the value of only one of the parameters, such that each of the parameters 102 may have a number of such direct influencers, the adjustment of each of which affects the value of just the parameter in question, as in the first embodiment. In the first embodiment, however, it was presumed that each distinct influencer affects its corresponding parameter instantaneously, or at least that the distinct influencers affects their corresponding parameter at the same response times—that is, it takes the same length of time (i.e., the response time) for each distinct influencer to affect its corresponding parameter.

By comparison, in this third embodiment, adjustment of each distinct influencer affects the value of one of the parameters at a particular response time that may be different than the response time at which another distinct influencer affects the value of its parameter. In mathematical terms, there are n parameters P: $P_1, P_2, \ldots, P_n$. Furthermore, for each parameter $P_x$ there are m distinct influencers I: $I_{x1}, I_{x2}, \ldots, I_{xm}$. The influencers $I_x$* affect only the parameter $P_x$ in this embodiment of the invention, at response times $t_x$*. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$.

For example, the parameter $P_1$ may have three distinct influencers $I_{11}$, $I_{12}$, and $I_{13}$. The influencer $I_{11}$ affects the parameter $P_1$ such that the parameter $P_1$ responds after adjustment of the influencer $I_{11}$ at a response time $t_{11}$. Similarly, the influencer $I_{12}$ affects the parameter $P_1$ at a response time $t_{12}$, and the influencer $I_{13}$ affects the parameter $P_3$ at a response time $t_{13}$. The response times $t_{11}$, $t_{12}$, and $t_{13}$ may be different from one another.

Figure 4:
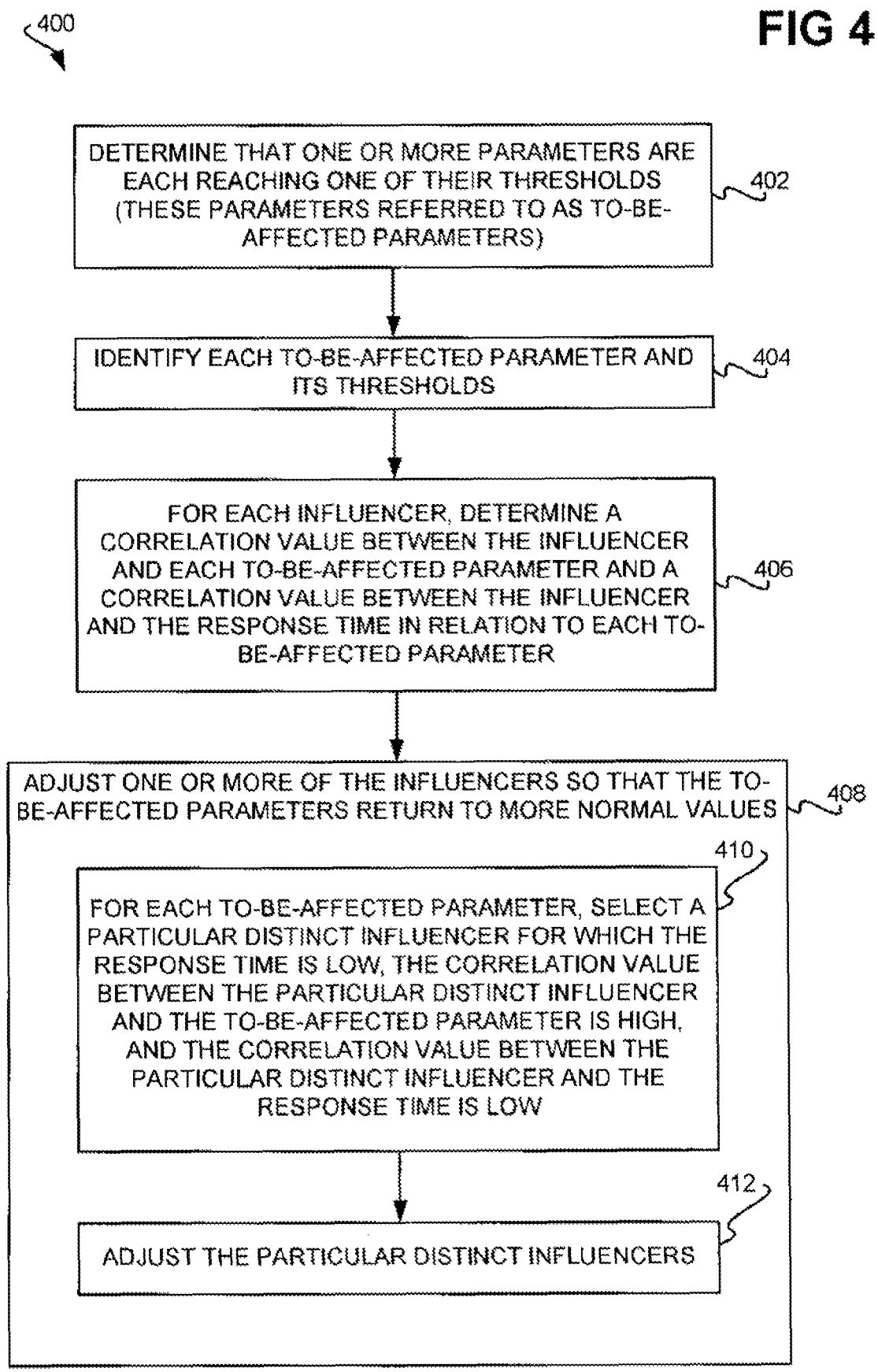
FIG. 4 is a flowchart of a method, according to a third embodiment of the invention.

FIG. 4 shows a method 400, according to this third embodiment of the invention. The daemon 106 determines that one or more of the parameters are each reaching one of their thresholds (402), where these parameters are referred to as to-be-affected parameters. In response, the system 100 identifies each to-be-affected parameter and its thresholds (404).

Two correlation values are determined for each distinct influencer of each to-be-affected parameter (406). First, for each to-be-affected parameter, a correlation value is determined between each distinct influencer of this parameter and this parameter, as in part 206 of the method 200. Second, for each to-be-affect parameter, a correlation value is determined between each distinct influencer of this parameter and the response time of this influencer in relation to this parameter. Thus, for each distinct influencer $I_{xy}$ influencing a given parameter $P_x$ at a response time $t_{xy}$, where y=1 . . . m, there is a correlation value r between −1 and 1 determined per the equation described above, but where p is one of the response times $t_{xy}$ and I is one of the distinct influencers $I_{xy}$.

The method 400 adjusts one or more of the influencers so that the to-be-affected parameters return to more-normal values, such as to their median values (408). In particular, for each to-be-affected parameter, a particular distinct influencer is selected (410). This particular distinct influencer is selected such that the response time as to the to-be-affected parameter in question is low, the correlation value between this influencer and the to-be-affected parameter in question is high, and the correlation value between this influencer and the response time at which it affects the to-be-affected parameter in question is low. All the particular distinct influencers that are selected are then adjusted so that the to-be-affected parameters return to more-normal values (412).

Fourth Embodiment

In a fourth embodiment of the invention, the system includes parameters 102 and influencers 104, where the influencers include both distinct influencers and common influencers. Adjustment of each of the distinct influencers 104 affects the value of only one of the parameters, such that each of the parameters 102 may have a number of such direct influencers, the adjustment of each of which affects the value of just the parameter in question. By comparison, adjustment of each of the common influencers 104 affects the values of more than one parameter. Thus, adjustment of a common influencer affects the values of at least two parameters associated with the common influencer in question.

Thus far, the fourth embodiment is similar to the second embodiment that has been described. However, in the second embodiment, it was presumed that each influencer affects it corresponding parameter(s) instantaneously, or at least that the influencers affect their corresponding parameter(s) at the same response times. That is, it takes the same length of time (i.e., the response time) for each influencer to affect its corresponding parameter(s).

By comparison, in this fourth embodiment, adjustment of each influencer affects the value of each of its corresponding parameters at a particular response time. This particular response time may be different than the response time at which adjustment of the same influencer affects the value of different of its corresponding parameters. This particular response may further be different than the response time at which adjustment of other influencers affects the value of their corresponding parameters.

In mathematical terms, there are n parameters P: $P_1$, $P_2$, ..., $P_n$. Furthermore, for each parameter $P_x$ there may be m distinct influencers I: $I_{x1}$, $I_{x2}$, ..., $I_{xm}$. Thus the distinct influencers $I_x^*$ affect only the parameter $P_x$ in this embodiment of the invention, at response times $t_x^*$. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$. In addition, there may be 1 common influencers $I_c$: $I_{c1}$, $I_{c2}$, ..., $I_{cl}$. Each common influencer $I_{cw}$, where w=1 ... l, affects a set of parameters $\{P_a, P_b, ..., P_j\}$ at corresponding response times $\{t_{ca}, t_{cb}, ..., t_{cj}\}$, where a, b, ... j are each selected from 1 ... n.

Figure 5:
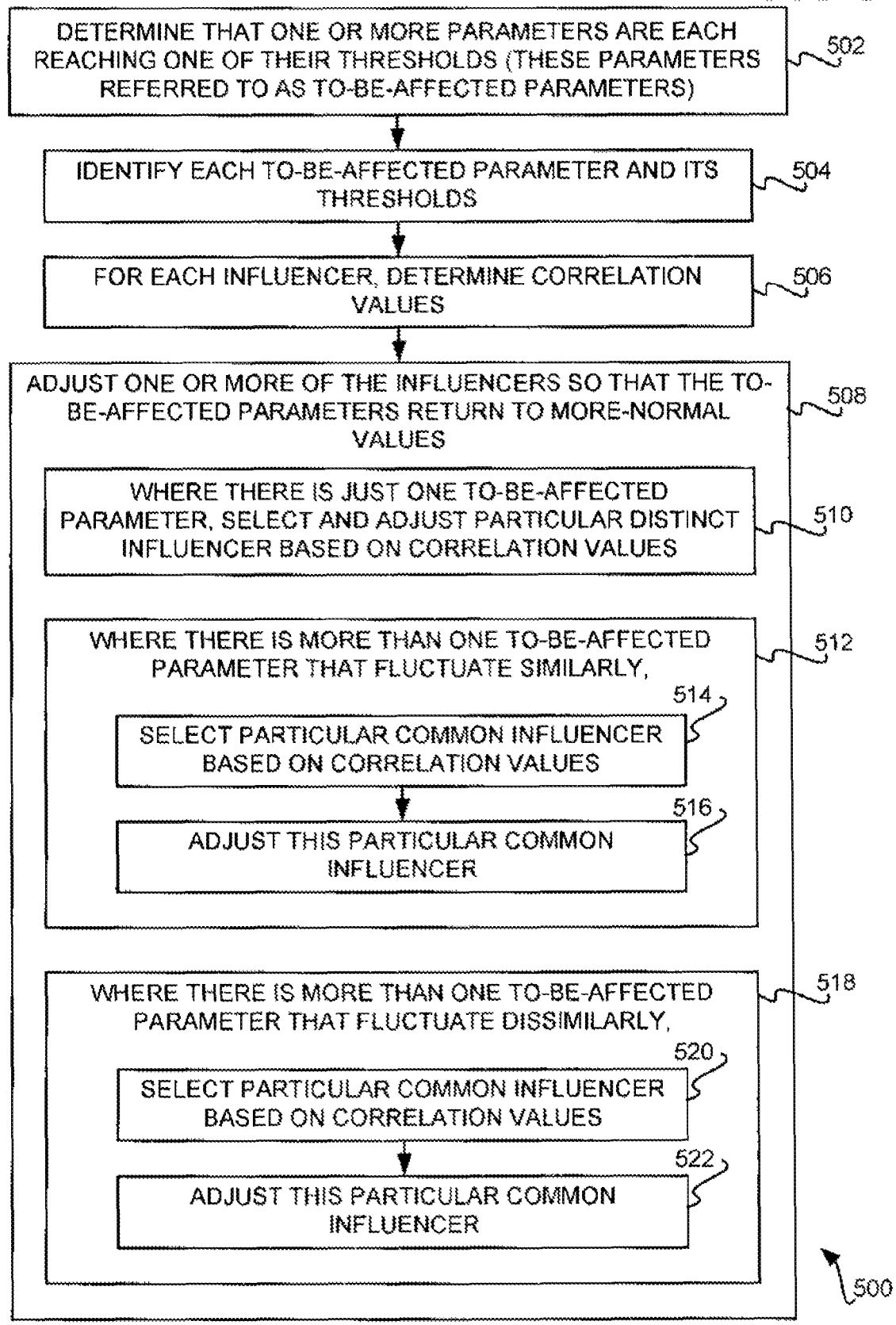
FIG. 5 is a flowchart of a method, according to a fourth embodiment of the invention.

FIG. 5 shows a method 500, according to this fourth embodiment of the invention. The daemon 106 determines that one or more of the parameters are each reaching one of their thresholds (502), where these parameters are referred to as to-be-affected parameters. In response, the system 100 identifies each to-be-affected parameter and its thresholds (504).

Two correlation values are determined for each influencer in relation to each to-be-affected parameter affected by this influencer (506). That is, first, for each to-be-affected parameter, a correlation value is determined between each influencer of this parameter (common or distinct) and this parameter. Second, for each to-be-affected parameter, a correlation value is determined between each influencer of this parameter (common or distinct) and the response time of this influencer in relation to this parameter, as has been described in part 406 in relation to distinct influencers in particular.

The method 500 adjusts one or more of the influencers so that the to-be-affected parameters return to more-normal values, such as to their median values (508). Where there is just one to-be-affected parameter, a particular distinct influencer is selected and adjusted based on the correlation values determined (510). More specifically, a particular distinct influencer is selected for which the response time as to the to-be-affected parameter is low, the correlation value between the particular distinct influencer and the to-be-affected parameter is high, and the correlation value between the particular distinct influencer and the response time is low.

Where there is more than one to-be-affected parameter that fluctuate similarly (512), a particular common influencer is selected based on the correlation values determined (514). More specifically, the particular common influencer is selected such that a sum of the response times of this influencer as to the to-be-affected parameters is low, the correlation value between this influencer and each to-be-affected parameter is high, and the correlation value between this influencer and the response time as to each to-be-affected parameter is low. This selected particular common influencer is then adjusted (516) to return the to-be-affected parameters to more-normal values.

Where there is more than one to-be-affected parameter that fluctuate dissimilarly (518), a particular common influencer is also selected based on the correlation values determined (520). More specifically, the particular common influencer is selected such that a sum of the response times of this influencer as to the to-be-affected parameters is low, an absolute value of a product of the correlation values between this influencer and the to-be-affected parameters is high, and an absolute value of a product of the correlation values between this influencer and the response times as to the to-be-affected parameters is low. This selected particular common influencer is then adjusted (522) to return the to-be-affected parameters to more-normal values.

Fifth Embodiment

In a fifth embodiment, the system 100 includes parameters 102 and influencers 104, where the influencers include both distinct influencers and meta influencers. As before, adjustment of each of the distinct influencers 104 affects the value of only one of the parameters, such that each of the parameters 102 may have a number of such direct influencers, the adjustment of each of which affects the value of just the parameter in question. These distinct influencers are direct influencers in that they directly influence the parameters.

By comparison, the meta influencers indirectly influence the parameters. Adjustment of each meta influencer specifically directly influences one of the direct influencers, which in turn affects the value of one of the parameters. In this embodiment, the system 100 can perturb or adjust just the meta influencers to influence the parameters. Thus, adjusting a meta influencer influences a direct influencer, which influences a parameter.

In mathematical terms, there are n parameters P: $P_1$, $P_2$, ..., $P_n$. Furthermore, for each parameter $P_x$ there may be m distinct influencers I: $I_{x1}$, $I_{x2}$, ..., $I_{xm}$. Thus the distinct influencers $I_x^*$ affect only the parameter $P_x$ in this embodiment of the invention. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$. In addition, there may be k meta influencers $I_m$: $I_{m1}$, $I_{m2}$, ..., $I_{mk}$. Each meta influencer $I_{cw}$, where w=1 ... m, affects one of the direct influencers.

Figure 6:
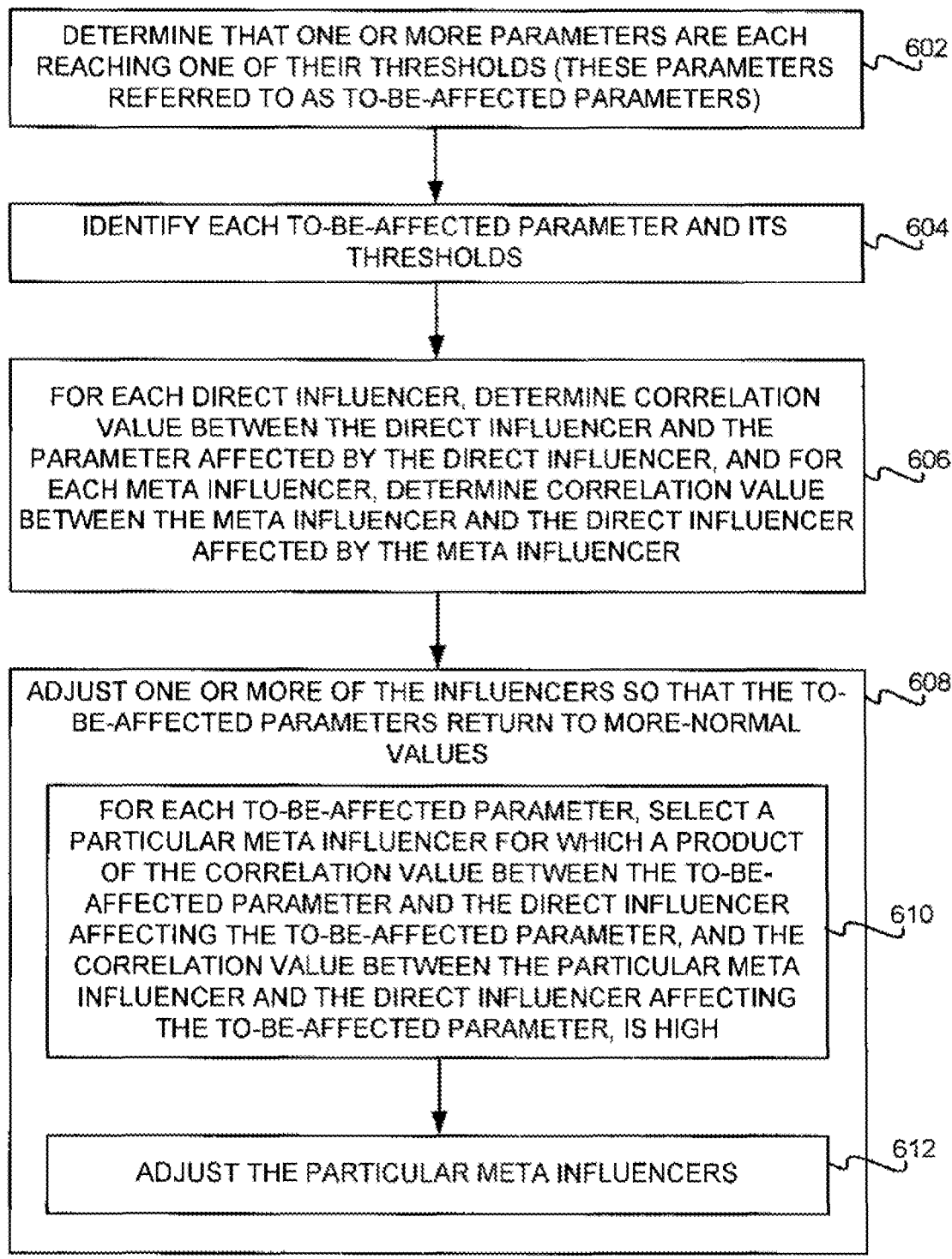
FIG. 6 is a flowchart of a method, according to a fifth embodiment of the invention.

FIG. 6 shows a method 600, according to this fifth embodiment of the invention. As before, the daemon 106 determines that one or more of the parameters are each reaching one of their thresholds (602). These parameters are referred to herein as to-be-affected parameters. In response, the system 100 identifies each to-be-affected parameter and its thresholds (604).

For each influencer, a correlation value is determined as follows (606). First, for each to-be-affected parameter, a correlation value is determined between each direct influencer of this parameter and this parameter. Second, for each meta influencer, a correlation value is determined between this meta influencer and the direct influencer affected, or influenced, by this meta influencer.

The method 600 then adjusts one or more of the meta influencers so that the to-be-affected parameters return to more-normal values, such as to their median values (608). In particular, for each to-be-affected parameter, a particular meta influencer is selected as follows (610). The particular meta influencer is selected for which a product of the correlation value between a given direct influencer affecting the to-be-affected parameter and the to-be-affected parameter, and the correlation value between the particular meta influencer and this given direct influencer, is high. The particular meta influencers selected for the to-be-affected parameters are then adjusted to return these parameters to more-normal values (612).

Sixth Embodiment

In a sixth embodiment, the system 100 includes parameters 102 and influencers 104, where the influencers include both distinct influencers and meta influencers. As before, adjustment of each of the distinct influencers 104 affects the value of only one of the parameters, such that each of the parameters 102 may have a number of such direct influencers, the adjustment of each of which affects the value of just the parameter in question. These distinct influencers are direct influencers in that they directly influence the parameters.

By comparison, the meta influencers indirectly influence the parameters. The meta influencers are organized over at least two levels, including a first level and a last level. Adjustment of each meta influencer at the first level specifically directly influences one of the direct influencers, which in turn affects the value of one of the parameters. Adjustment of each meta influencer at each level other than the first level directly affects one of the meta influencers at an immediately lower (i.e., at a level closer to the parameters) level. In this embodiment, the system 100 can perturb or adjust just the meta influencers at the last level to influence the parameters.

In mathematical terms, there are n parameters P: $P_1$, $P_2$, ..., $P_n$. Furthermore, for each parameter $P_x$ there may be n distinct influencers I: $I_{x1}$, $I_{x2}$, ..., $I_{xm}$. Thus the distinct influencers $I_x*$ affect only the parameter $P_x$ in this embodiment of the invention. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$. In addition, there may be k meta influencers at each level j, such that for each level j there are k meta influencers $I_{jm}$: $I_{jm1}$, $I_{jm2}$, ..., $I_{jmk}$.

Figure 7:
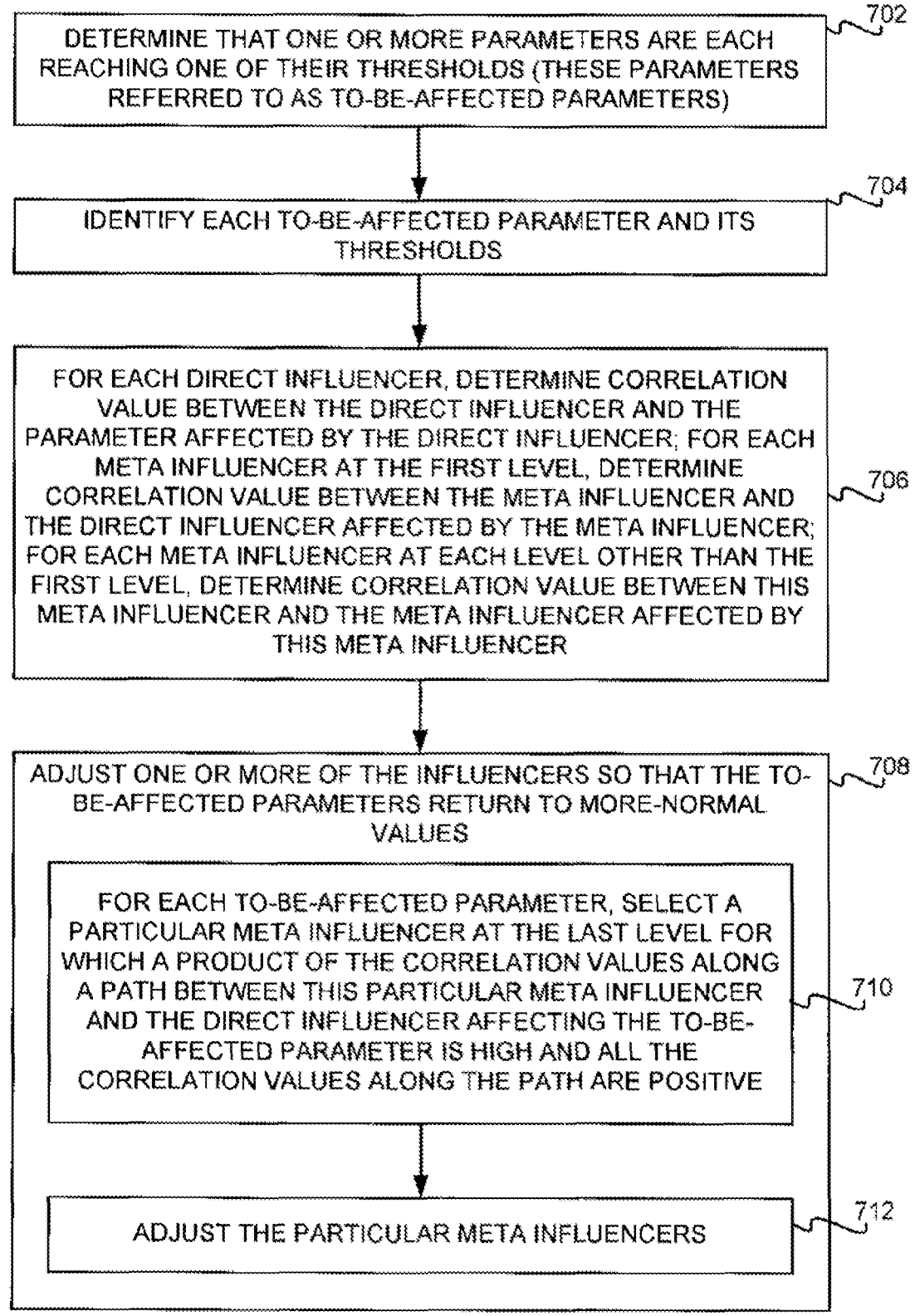
FIG. 7 is a flowchart of a method, according to a sixth embodiment of the invention.

FIG. 7 shows a method 700, according to this sixth embodiment of the invention. As before, the daemon 106 determines that one or more of the parameters are each reaching one of their thresholds (702). These parameters are referred to herein as to-be-affected parameters. In response, the system 100 identifies each to-be-affected parameter and its thresholds (704).

For each influencer, a correlation value is determined as follows (706). First, for each to-be-affected parameter, a correlation value is determined between each direct influencer of this parameter and this parameter. Second, for each meta influencer at the first level, a correlation value is determined between this meta influencer and the direct influencer affected, or influenced, by this meta influencer. Third, for each meta influencer at a level other than the first level, a correlation value is determined between this meta influencer and the meta influencer at the preceding level affected by this meta influencer. Correlation values between meta influencers in this and other embodiments of the invention are determined as has been described in the equation above, where both p and i are meta influencers.

The method 700 then adjusts one or more of the meta influencers so that the to-be-affected parameters return to more-normal values, such as to their median values (708). In particular, for each to-be-affected parameter, a particular meta influencer at the last level is selected as follows (710). The particular meta influencer is selected so that the product of the correlation values along a path between this particular meta influencer at the last level and the direct influencer affecting the to-be-affected parameter is high, and all the correlation values between meta influencers along the path are positive. The particular meta influencers selected for the to-be-affected parameters are then adjusted to return these parameters to more-normal values (712).

For example, there may be three levels of meta influencers. The meta influencers at the first level directly affect parameters. The meta influencers at the second level direct affect meta influencers at the first level. The meta influencers at the third, or last, level directly affect meta influencers at the second level. Therefore, for each to-be-affected parameter, a meta influencer is selected at the last level.

In this example, there is a path between a particular meta influencer at the third level and a particular meta influencer at the first level, where this latter meta influencer directly affects a given to-be-affected parameter, such that the product of the correlation values along this path is high. That is, the product of the correlation value between the particular meta influencer at the third level and a meta influencer at the second level, and the correlation value between this meta influencer at the second level and a meta influencer at the third level directly affecting the given to-be-affected parameter, is high. For the particular meta influencer at the third level along this path, then, this is the meta influencer that is selected.

Seventh Embodiment

In a seventh embodiment, the system 100 includes parameters 102 and influencers 104, where the influencers include both distinct influencers and meta influencers. As before, adjustment of each of the distinct influencers 104 affects the value of only one of the parameters, such that each of the parameters 102 may have a number of such direct influencers, the adjustment of each of which affects the value of just the parameter in question. These distinct influencers are direct influencers in that they directly influence the parameters.

By comparison, the meta influencers indirectly influence the parameters. The meta influencers are organized over at least two levels, including a first level and a last level. Adjustment of each meta influencer at the first level specifically directly influences one of the direct influencers, which in turn affects the value of one of the parameters. Adjustment of each meta influencer at each level other than the first level directly affects one of the meta influencers at an immediately lower (i.e., at a level closer to the parameters) level. In this embodiment, the system 100 can perturb or adjust just the meta influencers at the last level to influence the parameters.

Thus far, the seventh embodiment is similar to the sixth embodiment that has been described. However, the sixth embodiment did not take into account response times at which the direct influencers influence parameters and at which the meta influencers influence other influencers. Thus, the sixth embodiment either can be considered as having equal response times in this way, and/or as having response times that are at least substantially instantaneous. By comparison, in the seventh embodiment, each direct influencer influences its corresponding parameter at a response time that may be different than the response times at which other influencers influence their respective parameters or influencers. Likewise, each meta influencer influences its corresponding (direct or meta) influencer at a response time that may be different than the response times at which other influencers influence their respective parameters or influencers.

In mathematical terms, there are n parameters P: $P_1$, $P_2$, ..., $P_n$. Furthermore, for each parameter $P_x$ there may be m distinct influencers I: $I_{x1}$, $I_{x2}$, ..., $I_{xm}$. Thus the distinct influencers $I_x*$ affect only the parameter $P_x$ in this embodiment of the invention, at response times $t_x*$. Each parameter $P_x$ also has two thresholds, a minimum threshold $T_{xmin}$ corresponding to the minimum value of the parameter $P_x$, and a maximum threshold $T_{xmax}$ corresponding to the maximum value of the parameter $P_x$. In addition, there may be k meta influencers at each level j, such that for each level j there are k meta influencers $I_{jm}$: $I_{jm1}$, $I_{jm2}$, ..., $I_{jmk}$, affecting the influencers at the preceding level j−1 at response times $t_{jm1}$, $t_{jm2}$, ..., $t_{jmk}$.

Figure 8:
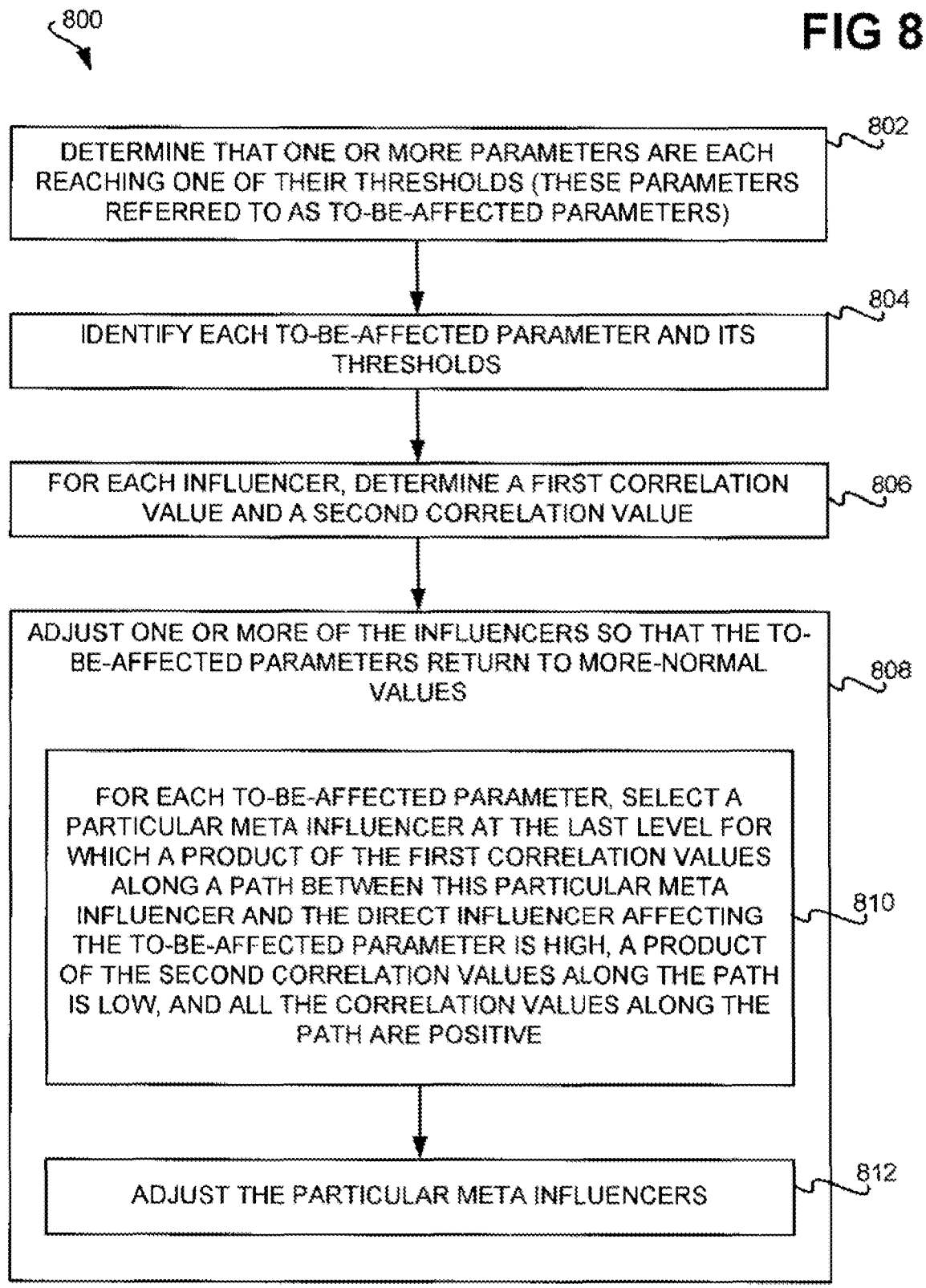
FIG. 8 is a flowchart of a method, according to a seventh embodiment of the invention.

FIG. 8 shows a method 800, according to this seventh embodiment of the invention. As before, the daemon 106 determines that one or more of the parameters are each reaching one of their thresholds (802). These parameters are referred to herein as to-be-affected parameters. In response, the system 100 identifies each to-be-affected parameter and its thresholds (804).

For each influencer, a correlation value is determined as follows (806). First, for direct influencer, a first correlation value is determined between the direct influencer and the parameter affected by the direct influencer, and a second correlation value is determined between the direct influencer and the response time at which the direct influencer affects this parameter. Second, for each meta influencer at the first level, a first correlation value is determined between the meta influencer and the direct influencer affected by the meta influencer, and a second correlation value is determined between the meta influencer and the response time at which the meta influencer affects this direct influencer. Third, for each meta influencer at each level other than the first level, a first correlation value is determined between the meta influencer and the meta influencer at an immediately lower level affected thereby, and a second correlation value is determined between the meta influencer and the response time at which the meta influencer at the immediately lower level is affected thereby.

The method 800 then adjusts one or more of the meta influencers so that the to-be-affected parameters return to more-normal values, such as to their median values (808). In particular, for each to-be-affected parameter, a particular meta influencer at the last level is selected as follows (810). The particular meta influencer is selected so that the product of the first correlation values along a path between this particular meta influencer at the last level and the direct influencer affecting the to-be-affected parameter is high, the product of the second correlation values along this path is low, and all the correlation values (both first and second) between meta influencers along the path are positive. The term path in this embodiment is used in the same way in which this term has been described by example in relation to the previous embodiment. The particular meta influencers selected for the to-be-affected parameters are then adjusted to return these parameters to more-normal values (812).

Eighth Embodiment

In an eighth embodiment, the system 100 includes parameters 102 and influencers 104, where the influencers include both parameter influencers and meta influencers. Adjustment of each of the parameter influencers 104 direct affects the value one or more parameters. As such, a parameter influencer can be a distinct influencer or a common influencer, as these terms have been described previously. The parameter influencers are direct influencers, in that they directly influence one or more parameters.

By comparison, the meta influencers indirectly influence the parameters. The meta influencers are organized over at least two levels, including a first level and a last level. Adjustment of each meta influencer at the first level specifically directly influences one or more of the parameters influencers, which in turn affects the value of one or more of the parameters. Adjustment of each meta influencer at each level other than the first level directly affects one or more of the meta influencers at an immediately lower (i.e., at a level closer to the parameters) level. In this embodiment, the system 100 can perturb or adjust just the meta influencers at the last level to influence the parameters.

Thus far, the eighth embodiment differs from the sixth embodiment that has been described insofar as the meta influencers can each influence more than one other influencer, as opposed to just one influencer as in the sixth embodiment. Likewise, each parameter influencer can influence more than one parameter, as opposed to just one parameter as in the sixth embodiment. Furthermore, a in the seventh embodiment, in the eighth embodiment each direct influencer influences its corresponding parameter(s) at a response time(s) that may be different than the response times at which other influencers influence their respective parameters or influencers. Likewise, each meta influencer influences its corresponding (parameter or meta) influencer(s) at a response time(s) that may be different than the response times at which other influencers influence their respective parameters or influencers.

Figure 9:
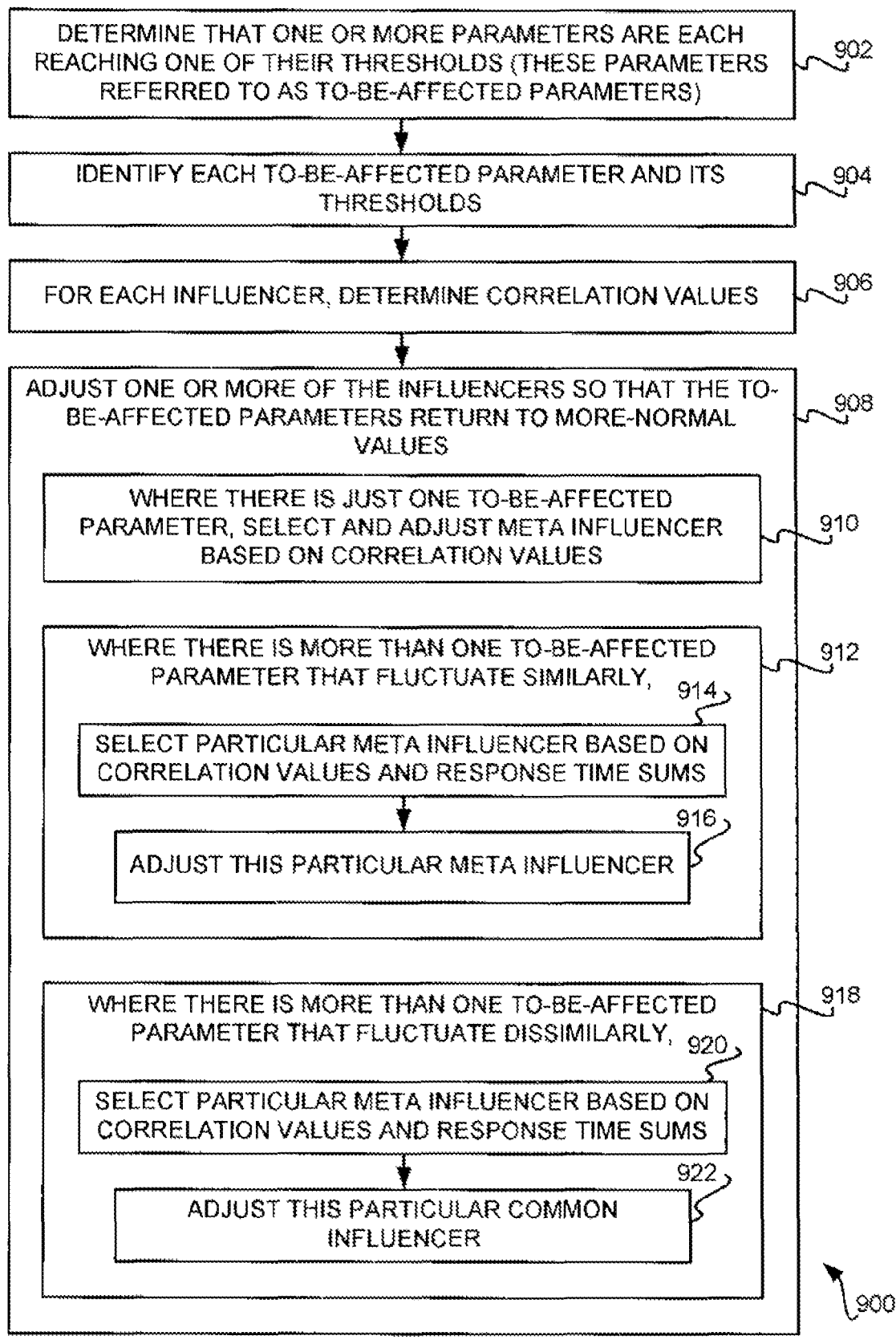
FIG. 9 is a flowchart of a method, according to an eighth embodiment of the invention.

FIG. 9 shows a method 900, according to this seventh embodiment of the invention. As before, the daemon 106 determines that one or more of the parameters are each reaching one of their thresholds (902). These parameters are referred to herein as to-be-affected parameters. In response, the system 100 identifies each to-be-affected parameter and its thresholds (904).

For each influencer, correlation values are determined as follows (906). First, for each parameter influencer, a first correlation value is determined between the parameter influencer and each parameter affected by the direct influencer, and a second correlation value is determined between the parameter influencer and the response time at which the direct influencer affects each such parameter. Second, for each meta influencer at the first level, a first correlation value is determined between the meta influencer and each parameter influencer affected by the meta influencer, and a second correlation value is determined between the meta influencer and the response time at which the meta influencer affects each such parameter influencer. Third, for each meta influencer at each level other than the first level, a first correlation value is determined between the meta influencer and each meta influencer at an immediately lower level affected thereby, and a second correlation value is determined between the meta influencer and the response time at which each such meta influencer at the immediately lower level is affected thereby.

The method 900 then adjusts one or more of the meta influencers so that the to-be-affected parameters return to more-normal values, such as to their median values (908). In particular, where there is just one to-be-affected parameter, a particular meta influencer is selected at the last level as follows (910). The particular meta influencer is selected at the last level for which a product of the first correlation values along a path between the first particular meta influencer at the last level and the direct influencer affecting the to-be-affected parameter is high, for which a product of the second correlation values along the path is low, and the correlation values between meta influencers along the path are all positive. The particular meta influencer is then adjusted to return the to-be-affected parameter to a more-normal value.

Where there is more than one to-be-affected parameter that fluctuate similarly (912), a particular meta influencer is selected at the last level as follows (914). The particular meta influencer is selected at the last level such that:

1) a sum of the response times as to the to-be-affected parameters is low;

2) a product of the first correlation values as to the two-be affected parameters at each level is high, a product of the second correlation values as to the to-be-affected parameters at each level is low;

3) a product of the first correlation values along a path between the particular meta influencer at the last level and the direct influencers affecting the to-be-affected parameters is high; and, 4) a product of the second correlation values along this path is low. The particular meta influencer is then adjusted to return the to-be-affected parameters to more-normal values (916).

Where there is more than one to-be-affected parameter that fluctuates dissimilarly (918), a particular meta influencer is selected at the last level as follows (920). The particular meta influencer is selected at the last level such that:

1) a sum of the response times as to the to-be-affected parameters is low;

2) an absolute value of a product of the first correlation values as to the two-be affected parameters at each level is high, a product of the second correlation values as to the to-be-affected parameters at each level is low;

3) an absolute value of a product of the first correlation values along a path between the particular meta influencer at the last level and the direct influencers affecting the to-be-affected parameters is high; and, 4) an absolute value of a product of the second correlation values along this path is low. The particular meta influencer is then adjusted to return the to-be-affected parameters to more-normal values (922). It is noted that the term path in this embodiment is used in the same way in which this term has been described by example in relation to previous embodiments of the invention.

Ninth Embodiment

In the ninth through sixteenth embodiments of the invention, the system 100 does not include the influencers 104, and/or the influencers 104 are not used to affect the values of the parameters 102. Rather, once the daemon 106 has detected that one or more of the parameters 102 are reaching their respective thresholds, the system 100 is informed, and the system 100 directly modifies one or more of the parameters 102 so that the parameters 102 that are reaching their respective thresholds return to more-normal values, such as median values. In mathematical terms, there are n parameters P: $P_1, P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$.

Figure 10:
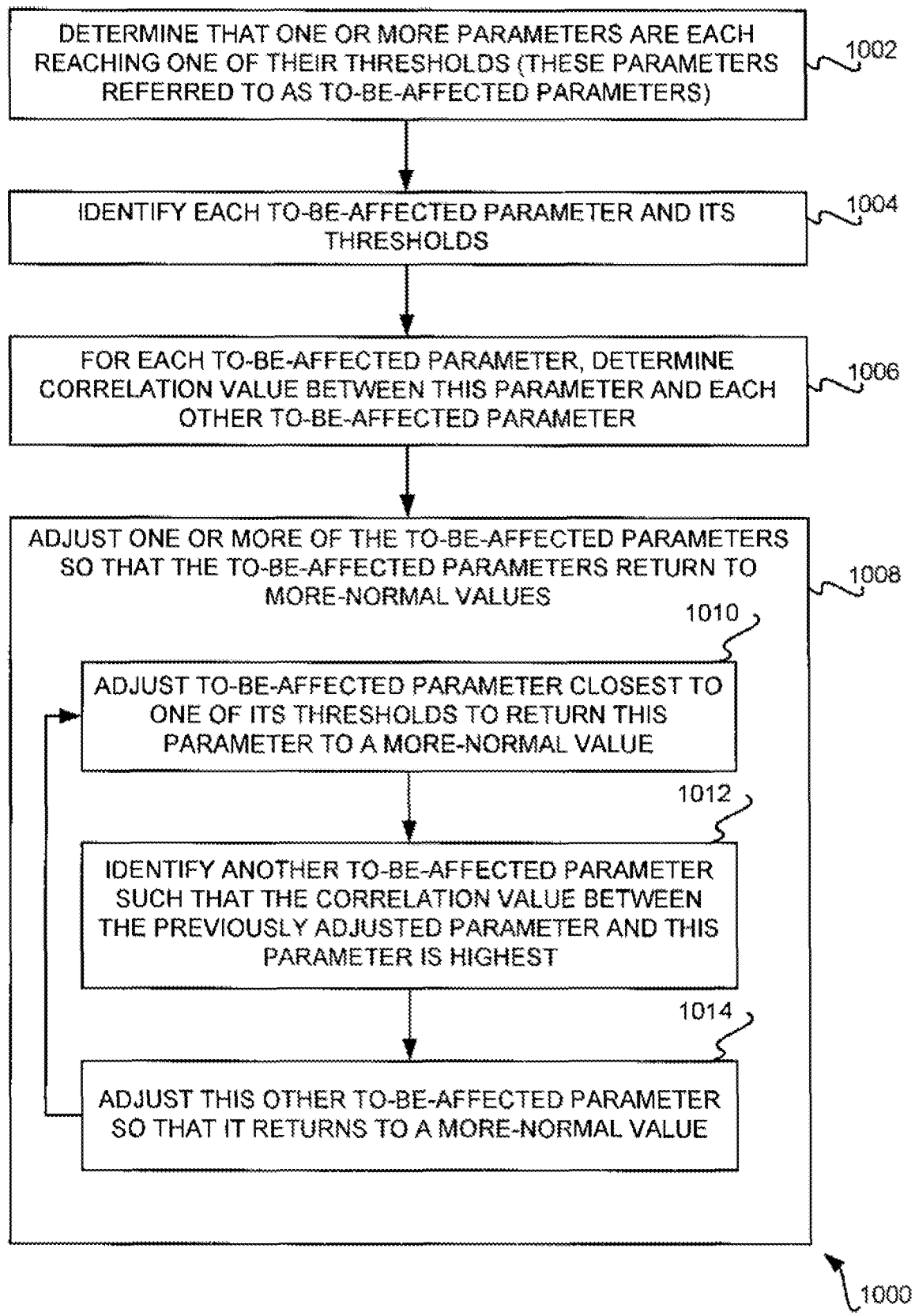
FIG. 10 is a flowchart of a method, according to a ninth embodiment of the invention.

FIG. 10 shows a method 1000, according to the ninth embodiment of the invention. The daemon 106 determines that one or more of the parameters are each reaching one of their thresholds (1002). These parameters are referred to herein as to-be-affected parameters. In response, the system 100 identifies each to-be-affected parameter and its threshold (1004).

A correlation value is determined between each to-be-affected parameter and each other to-be-affected parameter (1006). That is, the parameters are not necessarily independent of one another, such that changing the value of one parameter can change the value of one or more other parameters. One or more of the to-be-affected parameters are then adjusted so that all the to-be-affected parameters return to more-normal values, based on the correlation values determined (1008).

More specifically, the to-be-affected parameter that is closest to one of its thresholds is directly adjusted to return it to a more-normal value (1010). Thereafter, a second to-be-affected parameter is identified such that there is a highest correlation between the to-be-affected parameter adjusted in part 1010 and this second to-be-affected parameter (1012). This parameter is then adjusted to return the second to-be-affected parameter to a more-normal value as well (1014). In one embodiment, the method 1000 may be repeated at 1010.

Tenth Embodiment

In the tenth embodiment, the system 100 again does not include the influencers 104, and/or the influencers 104 are not used to affect the values of the parameters 102, as in the ninth embodiment. The difference between the ninth and tenth embodiments is that in the former, it was presumed that each parameter affected each other parameter at the same response time, and/or instantaneously. By comparison, in the tenth embodiment, each parameter affects one or more other parameters at response times, where the response time at which this parameter affects a first given parameter may be different than the response time at which this parameters affects a second given parameter. Likewise, the response times at which a parameter affects one or more other parameters may be different than the response times at which other parameters affect parameters. Thus, it takes a length of time (the response time) after a first parameter has been changed before a second parameter is changed due to the change in the first parameter.

In mathematical terms, there are n parameters P: $P_1, P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter affects one or more other parameters at (potentially different) response times t.

Figure 11:
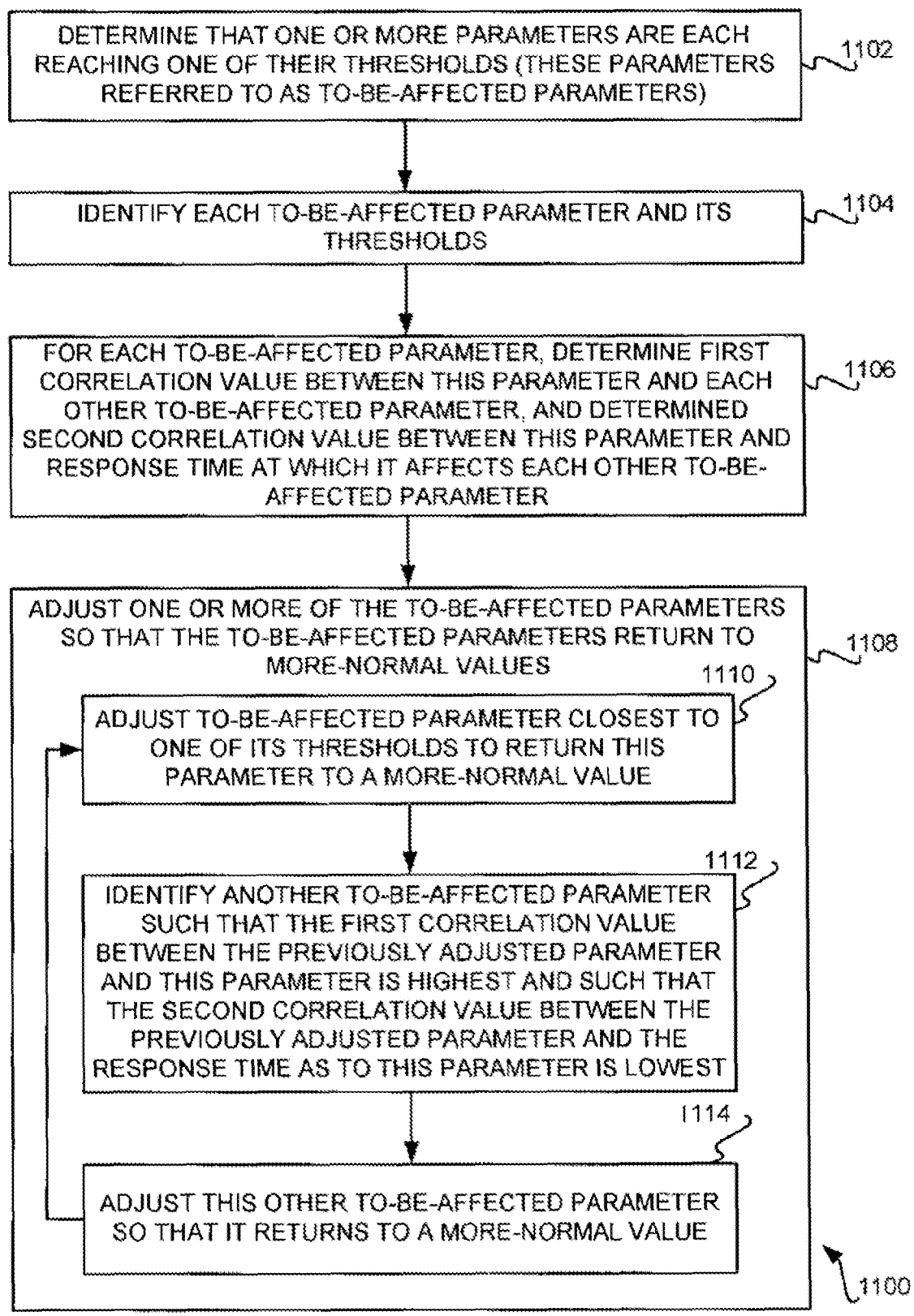
FIG. 11 is a flowchart of a method, according to a tenth embodiment of the invention.

FIG. 11 shows a method 1100, according to the tenth embodiment of the invention. The daemon 106 determines that one or more of the parameters are each reaching one of their thresholds (1102). These parameters are referred to herein as to-be-affected parameters. In response, the system 100 identifies each to-be-affected parameter and its threshold (1104).

For each to-be-affected parameter, two correlation values are determined (1106). A first correlation value is determined between a given to-be-affected parameter and each to-be-affected parameter that this given parameter affects. A second correlation value is determined between a given to-be-affected parameter and the response time at which this given parameter affects each to-be-affected parameter. One or more of the to-be-affected parameters are then adjusted so that all the to-be-affected parameters return to more-normal values, based on the correlation values determined (1108).

More specifically, the to-be-affected parameter closest to one of its thresholds is directly adjusted to return it to a more-normal value (1110). Thereafter, a second to-be-affected parameter is identified such that a highest first correlation value is between the parameter adjusted in part 1110 and this parameter, and a lowest second correlation value is between the parameter adjusted in part 1110 and the response time at which this parameter is affected by the parameter adjusted in part 1110 (1112). This identified parameter is then adjusted to return it to a more-normal value (1114). In one embodiment, the method 1100 may be repeated at 1110.

Eleventh Embodiment

In the eleventh embodiment, the system 100 again does not include the influencers 104, and/or the influencers are not used to affect the values of the parameters 102. Each parameter affects one or more other parameters. Furthermore, it takes a length of time, referred to as a response time, after a parameter is attempted to be changed before the parameter is actually changed such that the system 100 as a whole is affected. The latter sentence can also be restated such that each parameter is affected such that it responds at a response time, where the response times at which different parameters are affected can be different.

In mathematical terms, there are n parameters P: $P_1$, $P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter is itself affected at a (potentially different) response time t.

Figure 12:
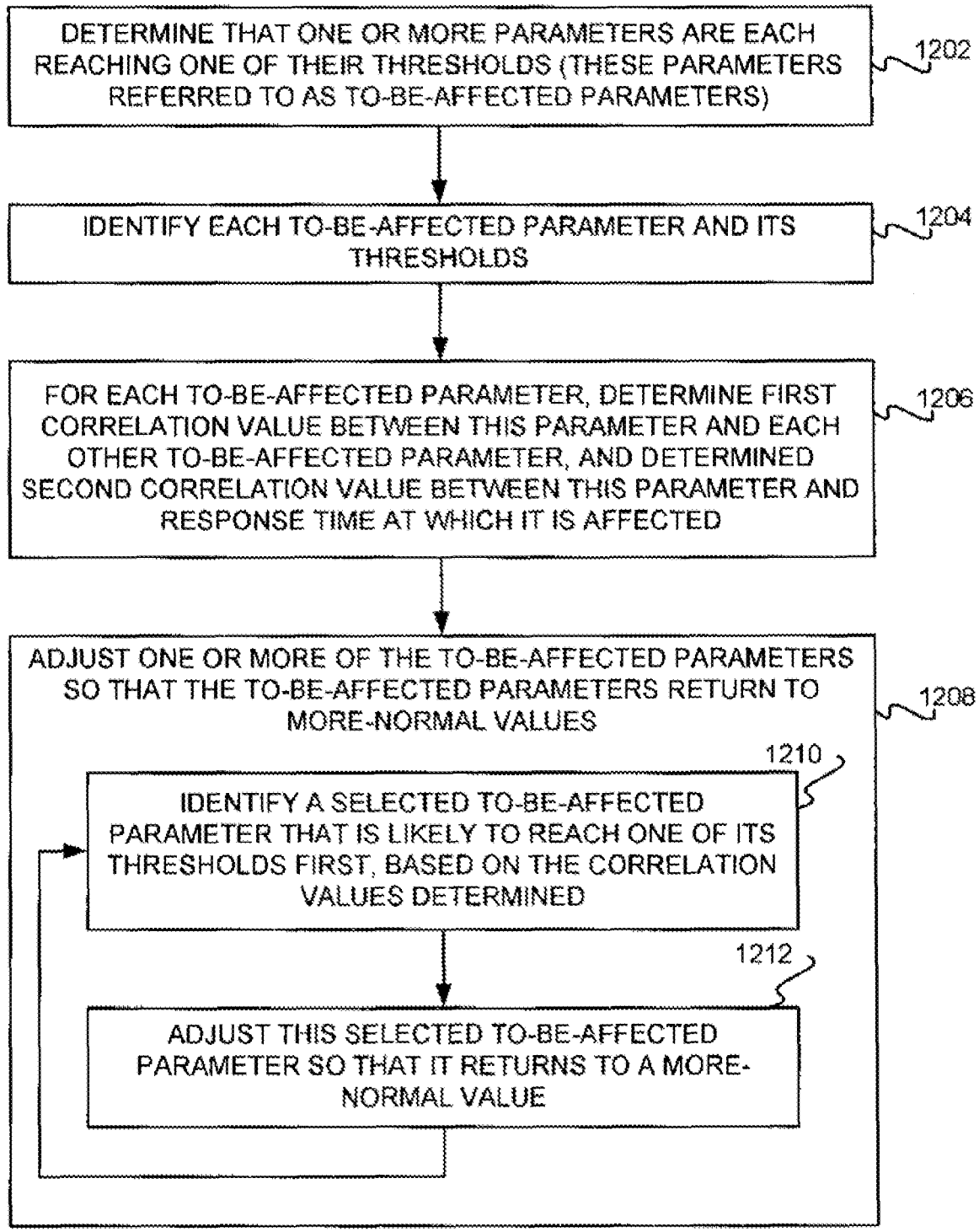
FIG. 12 is a flowchart of a method, according to an eleventh embodiment of the invention.

FIG. 12 shows a method 1200, according to this eleventh embodiment of the invention. The daemon 106 determines that one or more of the parameters are each reaching one of their thresholds (1202). These parameters are referred to herein as to-be-affected parameters. In response, the system 100 identifies each to-be-affected parameter and its threshold (1204).

For each to-be-affected parameter, two correlation values are determined (1206). A first correlation value is determined between each to-be-affected parameter and each other-to-be affected parameter. A second correlation value is determined between each-to-be affected parameter and the response time of this parameter (i.e., the time at which the parameter is affected). One or more of the to-be-affected parameters are then adjusted so that all the to-be-affected parameters return to more-normal values, based on the correlation values determined (1208).

More specifically, a to-be-affected parameter that is likely to reach one of its thresholds first is identified (1210). For instance, each to-be-affected parameter has a current value. The length of time at which the parameter will reach one of its thresholds is determined based on this current value, the threshold to which it is closest, and the second correlation value of the parameter, which corresponds to the rate at which the parameter is changing. The to-be-affected parameter that has the shortest length of time in this respect is that which is identified in part 1210. It is this selected to-be-affected parameter that is adjusted (1212) in order to return it to a more-normal value. The method 1200 may then be repeated at part 1200.

Twelfth Embodiment

In the twelfth embodiment, the system 100 again does not include the influencers 104, and/or the influencers are not used to affect the values of the parameters 102. Each parameter affects one or more other parameters at response times, as in the tenth embodiment. Furthermore, as in the eleventh embodiment, it takes a length of time, also referred to as a response time, after a parameter is attempted to be changed before the parameter is actually changed such that the system 100 as a whole is affected. The latter sentence can also be restated such that each parameter is affected such that it responds at a response time, where the response times at which different parameters are affected can be different.

In mathematical terms, there are n parameters P: $P_1$, $P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter is itself affected at a (potentially different) response time t. Each parameter also affects one or more other parameters at (potentially different) response times t.

Figure 13:
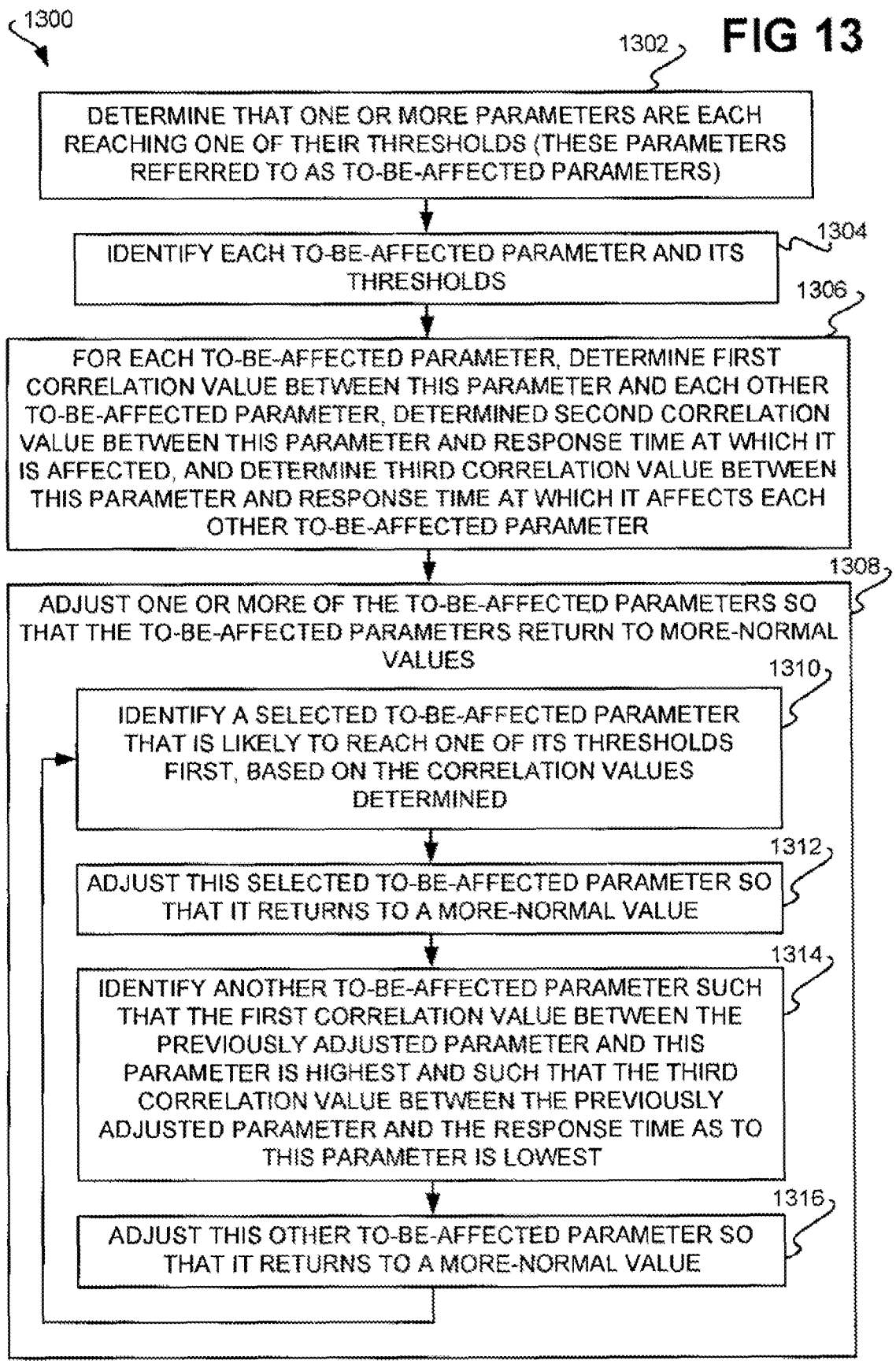
FIG. 13 is a flowchart of a method, according to a twelfth embodiment of the invention.

FIG. 13 shows a method 1300, according to this twelfth embodiment of the invention. The daemon 106 determines that one or more of the parameters are each reaching one of their thresholds (1302). These parameters are referred to herein as to-be-affected parameters. In response, the system 100 identifies each to-be-affected parameter and its threshold (1304).

For each to-be-affected parameter, three correlation values are determined (1306). A first correlation value is determined between each to-be-affected parameter and each other-to-be affected parameter. A second correlation value is determined between each-to-be affected parameter and the response time of this parameter (i.e., the time at which the parameter is affected), as in the eleventh embodiment. A third correlation value is determined between each-to-be affected parameter and the response time thereof in relation to each other to-be-affected parameter that it affects, as in the tenth embodiment. One or more of the to-be-affected parameters are then adjusted so that all the to-be-affected parameters return to more-normal values, based on the correlation values determined (1308).

More specifically, a to-be-affected parameter that is likely to reach one of its thresholds first is identified (1310), as in the eleventh embodiment. For instance, each to-be-affected parameter has a current value. The length of time at which the parameter will reach one of its thresholds is determined based on this current value, the threshold to which it is closest, and the second correlation value of the parameter, which corresponds to the rate at which the parameter is changing. The to-be-affected parameter that has the shortest length of time in this respect is that which is identified in part 1310. It is this selected to-be-affected parameter that is adjusted (1312) in order to return it to a more-normal value.

Thereafter, a second to-be-affected parameter is identified such that a highest first correlation value is between the parameter adjusted in part 1312 and this parameter, a lowest third correlation value is between the parameter adjusted in part 1312 and the response time at which this parameter is affected by the parameter adjusted in part 1312 (1314). Part 1314 is thus similar to part 1112 of the tenth embodiment. This identified parameter is then adjusted to return it to a more-normal value (1316). In one embodiment, the method 1300 may be repeated at 1310.

Thirteenth Embodiment

In the thirteenth embodiment, the system 100 again does not include the influencers 104, and/or the influencers 104 are not used to affect the values of the parameters 102, as in the ninth embodiment. The difference between the ninth and the thirteenth embodiments is that in the former, it was presumed that each parameter could be changed in real time. By comparison, in the thirteenth embodiment, each parameter can be changed in variable time. That is, after a parameter has been adjusted, it takes a given amount of variable time before the effects of the adjustment are actually evidenced or seen in the parameter. In this way, the variable time is similar to response time as has been discussed above, but the response time can vary (i.e., being a "variable" time), as opposed to being static.

In mathematical terms, there are n parameters P: $P_1$, $P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter affects one or more other parameters. Each parameter is further able to be changed at a variable time t.

Figure 14:
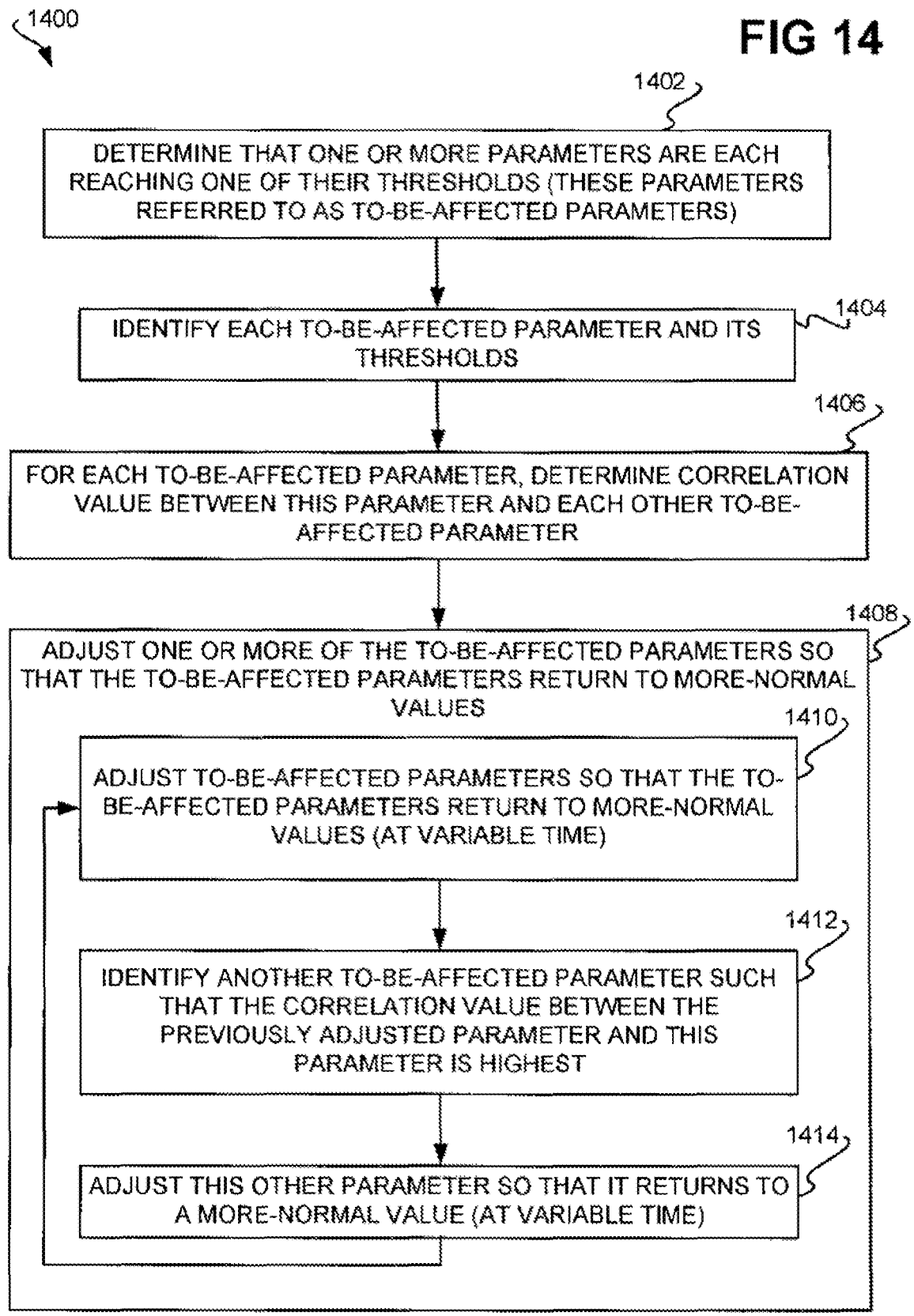
FIG. 14 is a flowchart of a method, according to a thirteenth embodiment of the invention.

FIG. 14 shows a method 1400, according to this thirteenth embodiment of the invention The daemon 106 determines that one or more of the parameters are each reaching one of their thresholds (1402). These parameters are referred to herein as to-be-affected parameters. In response, the system 100 identifies each to-be-affected parameter and its threshold (1404).

A correlation value is determined between each to-be-affected parameter and each other to-be-affected parameter (1406). That is, the parameters are not necessarily independent of one another, such that changing the value of one parameter can change the value of one or more other parameters. One or more of the to-be-affected parameters are then adjusted so that all the to-be-affected parameters return to more-normal values, based on the correlation values determined (1408). These parameters are adjusted such that the effects of the adjustments are evidenced within the parameters at variable times.

More specifically, the to-be-affected parameter that is closest to one of its thresholds is directly adjusted to return it to a more-normal value (1410). This parameter is adjusted such that the effects of the adjustment is evidenced within the parameter at a variable response time. Thereafter, a second to-be-affected parameter is identified such that there is a highest correlation between the to-be-affected parameter adjusted in part 1410 and this second to-be-affected parameter (1412). This parameter is then adjusted to return the second to-be-affected parameter to a more-normal value as well (1414). This parameter is also adjusted such that the effects of the adjustment is evidenced within the parameter at a variable response time. In one embodiment, the method 1000 may be repeated at 1410.

Fourteenth Embodiment

In the fourteenth embodiment, the system 100 again does not include the influencers 104, and/or the influencers 104 are not used to affect the values of the parameters 102. As in the tenth embodiment, each parameter affects one or more other parameters at response times, where the response time at which this parameter affects a first given parameter may be different than the response time at which this parameters affects a second given parameter. Likewise, the response times at which a parameter affects one or more other parameters may be different than the response times at which other parameters affect parameters. Thus, it takes a length of time (the response time) after a first parameter has been changed before a second parameter is changed due to the change in the first parameter. Furthermore, as in the thirteenth embodiment, each parameter can be changed in variable time.

In mathematical terms, there are n parameters P: $P_1$, $P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter affects one or more other parameters at (potentially different) response times t. Each parameter is further able to be changed at a variable time t.

Figure 15:
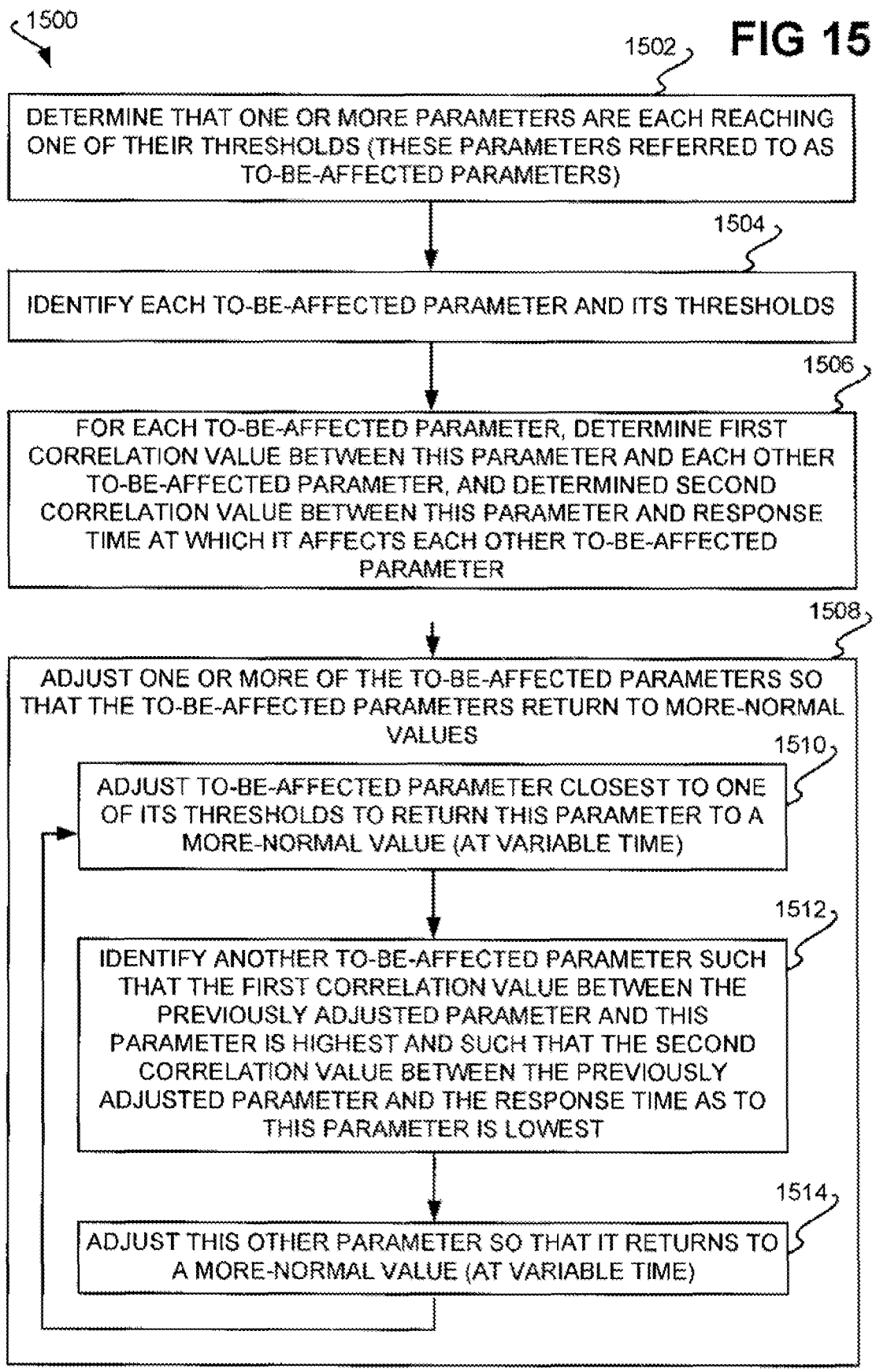
FIG. 15 is a flowchart of a method, according to a fourteenth embodiment of the invention.

FIG. 15 shows a method 1500, according to the fourteenth embodiment of the invention. The daemon 106 determines that one or more of the parameters are each reaching one of their thresholds (1502). These parameters are referred to herein as to-be-affected parameters. In response, the system 100 identifies each to-be-affected parameter and its threshold (1504).

For each to-be-affected parameter, two correlation values are determined (1506). A first correlation value is determined between a given to-be-affected parameter and each to-be-affected parameter that this given parameter affects. A second correlation value is determined between a given to-be-affected parameter and the response time at which this given parameter affects each to-be-affected parameter. One or more of the to-be-affected parameters are then adjusted so that all the to-be-affected parameters return to more-normal values, based on the correlation values determined (1508).

More specifically, the to-be-affected parameter closest to one of its thresholds is directly adjusted to return it to a more-normal value (1510). This parameter is adjusted such that the effects of the adjustment is evidenced within the parameter at a variable response time. Thereafter, a second to-be-affected parameter is identified such that a highest first correlation value is between the parameter adjusted in part 1510 and this parameter, and a lowest second correlation value is between the parameter adjusted in part 1510 and the response time at which this parameter is affected by the parameter adjusted in part 1510 (1512). This identified parameter is then adjusted to return it to a more-normal value (1514). This parameter is also adjusted such that the effects of the adjustment is evidenced within the parameter at a variable response time. In one embodiment, the method 1500 may be repeated at 1510.

Fifteenth Embodiment

In the eleventh embodiment, the system 100 again does not include the influencers 104, and/or the influencers are not used to affect the values of the parameters 102. As in the eleventh embodiment, each parameter affects one or more other parameters, and it takes a length of time, referred to as a response time, after a parameter is attempted to be changed before the parameter is actually changed such that the system 100 as a whole is affected. The latter sentence can also be restated such that each parameter is affected such that it responds at a response time, where the response times at which different parameters are affected can be different. Furthermore, as in the thirteenth embodiment, each parameter can be changed in variable time.

In mathematical terms, there are n parameters P: $P_1$, $P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter is itself affected at a (potentially different) response time t. Each parameter is further able to be changed at a variable time t.

Figure 16:
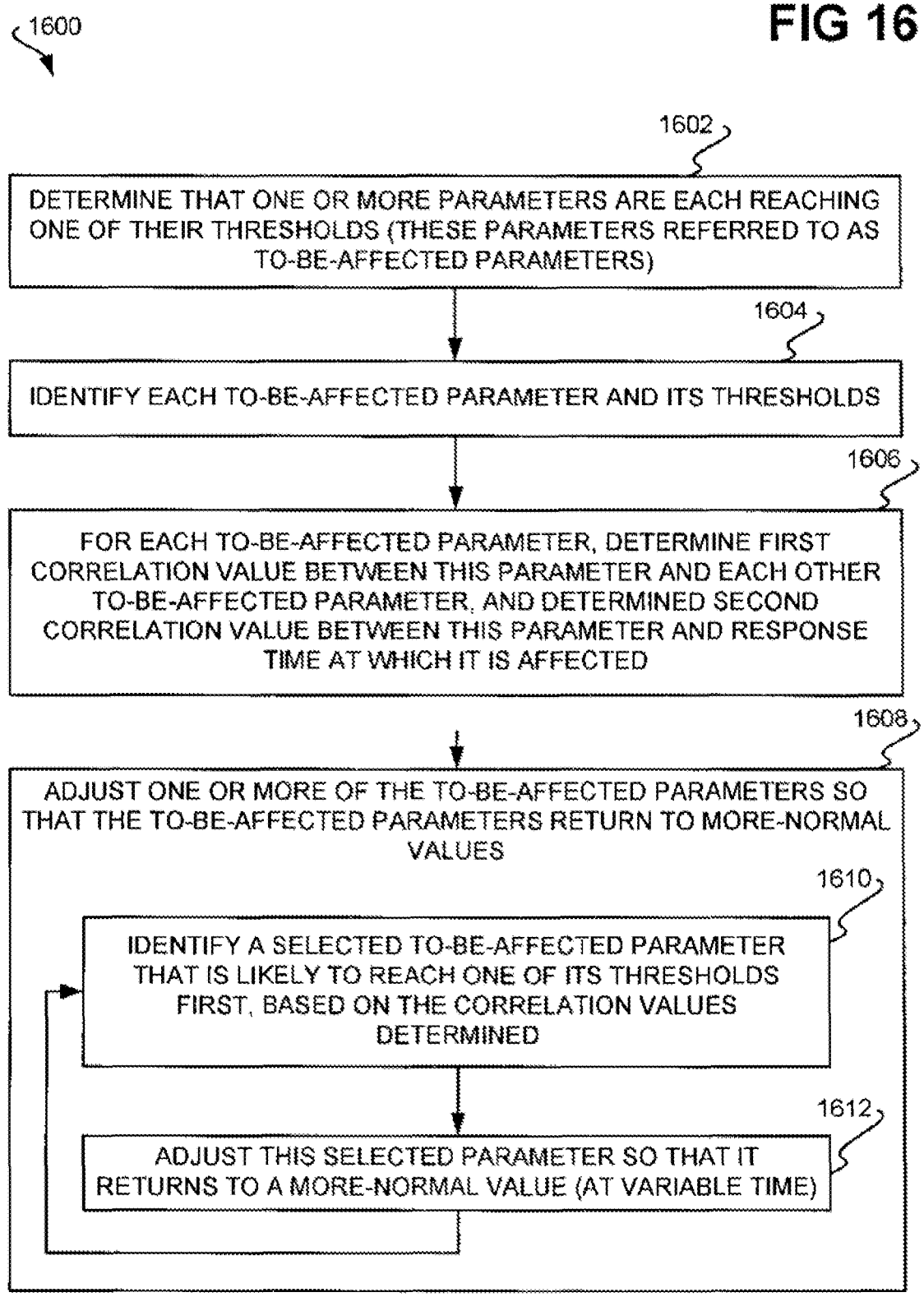
FIG. 16 is a flowchart of a method, according to a fifteenth embodiment of the invention.

FIG. 16 shows a method 1600, according to this fifteenth embodiment of the invention. The daemon 106 determines that one or more of the parameters are each reaching one of their thresholds (1602). These parameters are referred to herein as to-be-affected parameters. In response, the system 100 identifies each to-be-affected parameter and its threshold (1604).

For each to-be-affected parameter, two correlation values are determined (1606). A first correlation value is determined between each to-be-affected parameter and each other-to-be affected parameter. A second correlation value is determined between each-to-be affected parameter and the response time of this parameter (i.e., the time at which the parameter is affected). One or more of the to-be-affected parameters are then adjusted so that all the to-be-affected parameters return to more-normal values, based on the correlation values determined (1608).

More specifically, a to-be-affected parameter that is likely to reach one of its thresholds first is identified (1610). For instance, each to-be-affected parameter has a current value.

The length of time at which the parameter will reach one of its thresholds is determined based on this current value, the threshold to which it is closest, and the second correlation value of the parameter, which corresponds to the rate at which the parameter is changing. The to-be-affected parameter that has the shortest length of time in this respect is that which is identified in part 1610. It is this selected to-be-affected parameter that is adjusted (1612) in order to return it to a more-normal value. This parameter is adjusted such that the effects of the adjustment is evidenced within the parameter at a variable response time. The method 1600 may then be repeated at part 1600.

Sixteenth Embodiment

In the sixteenth embodiment, the system 100 again does not include the influencers 104, and/or the influencers are not used to affect the values of the parameters 102. As in the twelfth embodiment, each parameter affects one or more other parameters at response times, and it takes a length of time, also referred to as a response time, after a parameter is attempted to be changed before the parameter is actually changed such that the system 100 as a whole is affected. The latter sentence can also be restated such that each parameter is affected such that it responds at a response time, where the response times at which different parameters are affected can be different. Furthermore, as in the thirteenth embodiment, each parameter can be changed in variable time.

In mathematical terms, there are n parameters P: $P_1, P_2, \ldots, P_n$. Each parameter $P_x$ has two thresholds, a minimum threshold $T_{xmin}$ corresponding to the minimum value of the parameter $P_x$, and a maximum threshold $T_{xmax}$ corresponding to the maximum value of the parameter $P_x$. Each parameter is itself affected at a (potentially different) response time t. Each parameter also affects one or more other parameters at (potentially different) response times t. Each parameter is further able to be changed at a variable time t.

Figure 17:
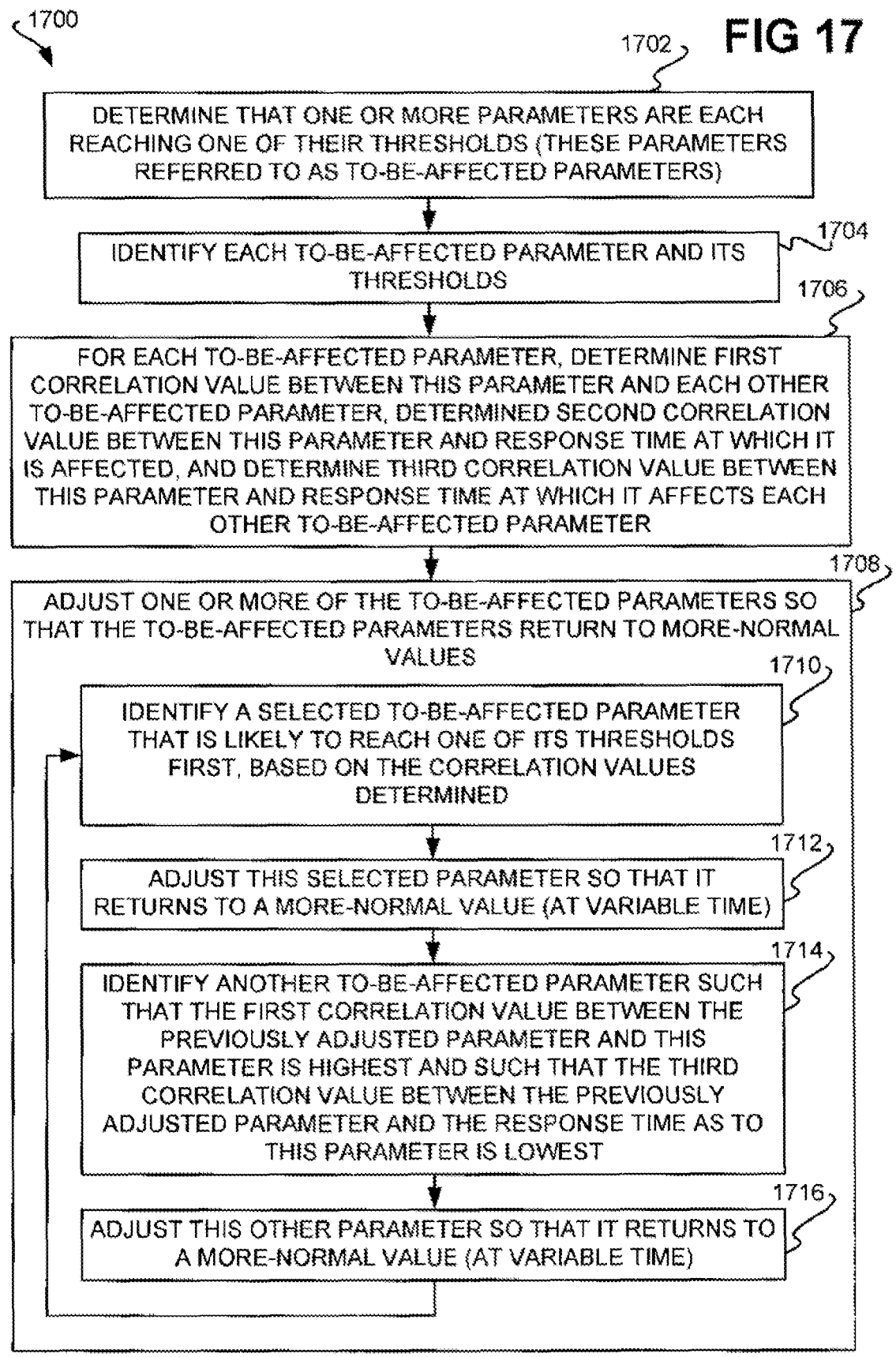
FIG. 17 is a flowchart of a method, according to a sixteenth embodiment of the invention.

FIG. 17 shows a method 1700, according to this sixteenth embodiment of the invention. The daemon 106 determines that one or more of the parameters are each reaching one of their thresholds (1702). These parameters are referred to herein as to-be-affected parameters. In response, the system 100 identifies each to-be-affected parameter and its threshold (1704).

For each to-be-affected parameter, three correlation values are determined (1706). A first correlation value is determined between each to-be-affected parameter and each other-to-be affected parameter. A second correlation value is determined between each-to-be affected parameter and the response time of this parameter (i.e., the time at which the parameter is affected), as in the eleventh embodiment. A third correlation value is determined between each-to-be affected parameter and the response time thereof in relation to each other to-be-affected parameter that it affects, as in the tenth embodiment. One or more of the to-be-affected parameters are then adjusted so that all the to-be-affected parameters return to more-normal values, based on the correlation values determined (1708).

More specifically, a to-be-affected parameter that is likely to reach one of its thresholds first is identified (1710), as in the fifteenth embodiment. For instance, each to-be-affected parameter has a current value. The length of time at which the parameter will reach one of its thresholds is determined based on this current value, the threshold to which it is closest, and the second correlation value of the parameter, which corresponds to the rate at which the parameter is changing. The to-be-affected parameter that has the shortest length of time in this respect is that which is identified in part 1710. It is this selected to-be-affected parameter that is adjusted (1712) in order to return it to a more-normal value. This parameter is adjusted such that the effects of the adjustment is evidenced within the parameter at a variable response time.

Thereafter, a second to-be-affected parameter is identified such that a highest first correlation value is between the parameter adjusted in part 1712 and this parameter, a lowest third correlation value is between the parameter adjusted in part 1712 and the response time at which this parameter is affected by the parameter adjusted in part 1712 (1714). This parameter is also adjusted such that the effects of the adjustment is evidenced within the parameter at a variable response time. Part 1714 is thus similar to part 1112 of the tenth embodiment. This identified parameter is then adjusted to return it to a more-normal value (1716). In one embodiment, the method 1700 may be repeated at 1710.

OTHER EMBODIMENTS AND CONCLUSION

In the embodiments of the invention that have been described, specific combinations of parameters; distinct and/or common influencers; distinct and/or common meta influencers; distinct and/or multiple-level meta influencers; response time; and/or variable time as affecting a given system has been presented. However, those of ordinary skill within the art can appreciate that not all embodiments of the invention are particularly limited to these specific combinations disclosed. That is, other embodiments can employ other, different specific combinations of parameters; distinct and/or common influencers; distinct and/or common meta influencers; distinct and/or multiple-level meta influencers; response time; and/or variable time as affecting a given system.

It is therefore finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

I claim:

1. A method for automatically maintaining an autonomic computing system in a steady state, the autonomic computing system having a plurality of parameters, each parameter having one or more thresholds, the autonomic computing system having a plurality of influencers, adjustment of the influencers affecting values of the parameters, the method comprising:

in response to determining that one or more of the parameters are each reaching one of the thresholds of the parameter, the one or more of the parameters referred to as to-be-affected parameters, identifying each to-be-affected parameter and the thresholds of the to-be-affected parameter;

for each influencer, determining a correlation value between the influencer and each to-be-affected parameter; and, adjusting one or more of the influencers so that the to-be-affected parameters return to more-normal values, based on the correlation values determined, wherein the influencers that are each distinctly associated with the parameters are referred to as distinct influencers, such that adjustment of each distinct influencer affects the value of only one of the parameters, wherein the influencers that are each commonly associated with more than one of the parameters are referred to as common influencers, such that adjustment of each common influencer affects the values of more than one of the parameters, and wherein adjusting one or more of the influencers so that the to-be-affected parameters return to more-normal values comprises:
- where the to-be-affected parameters are equal to one in number and referred to as a single to-be-affected parameter, for each pair of one or more distinct influencer/single to-be-affected parameter pairs in which the correlation value between the distinct influencer and the single to-be-affected parameter is high,
  - adjusting the distinct influencer of the pair so that the single to-be-affected parameter returns to a more-normal value;
- where the to-be-affected parameters are equal to more than one in number and fluctuate similarly,
  - selecting a first particular common influencer such that the correlation value between the first particular common influencer and each to-be-affected parameter is high;
  - adjusting the first particular common influencer so that the to-be-affected parameters return to more-normal values;
- where the to-be-affected parameters are equal to more than one in number and fluctuate dissimilarly,
  - selecting a second particular common influencer such that the correlation value between the second particular common influencer and each to-be-affected parameter is absolutely high, and such that the correlation value between the second particular common influencer and each to-be-affected parameter has a sign corresponding to whether the to-be-affected parameter is increasing or decreasing;
  - adjusting the second particular common influencer so that the to-be-affected parameters return to more-normal values.

2. A method for automatically maintaining an autonomic computing system in a steady state, the autonomic computing system having a plurality of parameters, each parameter having one or more thresholds, the autonomic computing system having a plurality of influencers, adjustment of the influencers affecting values of the parameters, the method comprising:
- in response to determining that one or more of the parameters are each reaching one of the thresholds of the parameter, the one or more of the parameters referred to as to-be-affected parameters,
  - identifying each to-be-affected parameter and the thresholds of the to-be-affected parameter;
  - for each influencer, determining a correlation value between the influencer and each to-be-affected parameter; and,
  - adjusting one or more of the influencers so that the to-be-affected parameters return to more-normal values, based on the correlation values determined,
- wherein the influencers that are each distinctly associated with the parameters are referred to as distinct influencers, such that adjustment of each distinct influencer affects the value of only one of the parameters at a response time,
- wherein the influencers that are each commonly associated with more than one of the parameters are referred to as common influencers, such that adjustment of each common influencer affects the values of more than one of the parameters at response times,
- wherein, for each influencer, determining the correlation value between the influencer and each-to-be affected parameter further comprises determining a correlation value between the influencer and the response time of the influencer as to each to-be-affected parameter, and wherein adjusting one or more of the influencers so that the to-be-affected parameters return to more-normal values comprises:
- where the to-be-affected parameters are equal to one in number and referred to as a single to-be-affected parameter,
  - selecting a particular distinct influencer for which the response time is low, the correlation between the particular distinct influencer and the to-be-affected parameter is high, and the correlation value between the particular distinct influencer and the response time is low;
  - adjusting the particular distinct influencer so that the to-be-affected parameter returns to a more-normal value;
- where the to-be-affected parameters are equal to more than one in number and fluctuate similarly,
  - selecting a first particular common influencer such that a sum of the response times of the particular common influencer as to the to-be-affected parameters is low, the correlation value between the first particular common influencer and each to-be-affected parameter is high, and the correlation value between the first particular common influencer and the response time as to each to-be-affected parameter is low;
  - adjusting the first particular common influencer so that the to-be-affected parameters return to more-normal values;
- where the to-be-affected parameters are equal to more than one in number and fluctuate dissimilarly,
  - selecting a second particular common influencer such that a sum of the response times of the particular common influencer as to the to-be-affected parameters is low, an absolute value of a product of the correlation values between the second particular common influencer and the to-be-affected parameters is high, and an absolute value of a product of the correlation values between the second particular common influencer and the response times as to the to-be-affected parameters is low;
  - adjusting the second particular common influencer so that the to-be-affected parameters return to more-normal values.

3. A method for automatically maintaining an autonomic computing system in a steady state, the autonomic computing system having a plurality of parameters, each parameter having one or more thresholds, the autonomic computing system having a plurality of influencers, adjustment of the influencers affecting values of the parameters, the method comprising:
- in response to determining that one or more of the parameters are each reaching one of the thresholds of the parameter, the one or more of the parameters referred to as to-be-affected parameters,
  - identifying each to-be-affected parameter and the thresholds of the to-be-affected parameter;
  - for each influencer, determining a correlation value between the influencer and each to-be-affected parameter; and, adjusting one or more of the influencers so that the to-be-affected parameters return to more-normal values, based on the correlation values determined, wherein the influencers that are distinctly associated with the parameters are referred to as direct influencers, such that adjustment of each influencer affects the value of only one of the parameters, wherein the influencers that are indirectly associated with the parameters are referred to as meta influencers, such that adjustment of each meta influencer directly affects one of the direct influencers, which in turn affects the value of one of the parameters, wherein, for each influencer, determining the correlation value between the influencer and each to-be-affected parameter comprises:

for each direct influencer, determining the correlation value between the direct influencer and the parameter affected by the direct influencer;

for each meta influencer, determining the correlation value between the meta influencer and the direct influencer affected by the meta influencer;

and wherein adjusting one or more of the influencers so that the to-be-affected parameters return to more-normal values comprises:

for each to-be-affected parameter, selecting a particular meta influencer for which a product of the correlation value between to-be-affected parameter and the direct influencer affecting the to-be-affected parameter and the correlation value between the particular meta influencer and the direct influencer affecting the to-be-affected parameter is high;

adjusting the particular meta influencers so that the to-be-affected parameters return to more-normal values.

* * * * *